(12) United States Patent
Stenersen et al.

(10) Patent No.: US 6,797,027 B2
(45) Date of Patent: Sep. 28, 2004

(54) FILTER ASSEMBLIES AND SYSTEMS FOR INTAKE AIR FOR FUEL CELLS

(75) Inventors: Eivind Stenersen, River Falls, WI (US); William Michael Nyman, Eagan, MN (US); Richard Thomas Canepa, Plymouth, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 50 days.

(21) Appl. No.: 10/122,647

(22) Filed: Apr. 10, 2002

(65) Prior Publication Data

US 2002/0157359 A1 Oct. 31, 2002

Related U.S. Application Data

(63) Continuation-in-part of application No. 09/879,441, filed on Jun. 12, 2001, which is a continuation-in-part of application No. 09/832,715, filed on Apr. 11, 2001.

(51) Int. Cl.$^7$ .......................... B01D 50/00; B01D 46/00; B01D 53/04; H01M 8/00
(52) U.S. Cl. .................. 55/350.1; 55/385.1; 55/467; 55/473; 55/482; 55/486; 55/487; 55/495; 55/527; 55/528; 96/108; 96/121; 96/134; 96/136; 96/380; 429/12
(58) Field of Search ............................ 55/350.1, 385.1, 55/385.3, 467, 473, 482, 486, 487, 495, 503, 524, 527, 528; 96/108, 121, 134, 136, 154, 380, 381, 383, 384, 385, 386, 387, 388; 429/12

(56) References Cited

U.S. PATENT DOCUMENTS 3,812,370 A * 5/1974 LaViolette .................. 55/473
3,847,672 A 11/1974 Trocciola et al.

(List continued on next page.)

FOREIGN PATENT DOCUMENTS

| EP | 0677417 | 2/1995 | |
|----|---------|--------|---|
| EP | 0 837 238 A2 | 6/1997 | |
| EP | 1 158 590 A2 | 4/2001 | |
| EP | 1 162 354 A2 | 4/2001 | |
| EP | 1 195 830 A2 | 10/2001 | |
| GB | 2250130 | 11/1991 | |
| JP | 9-26177 | * 1/1997 | ............ F01N/1/24 |
| JP | 09026177 | 1/1997 | |
| WO | WO 01/48850 | 7/2001 | |

OTHER PUBLICATIONS

Moore, J. et al., "The effects of battlefield contaminants on PEMFC performance", *Journal of Power Sources*, vol. 85, pp. 254–260 (2000).

Sakamoto, S. et al., "Study of the Factors Affecting PEFC Life Characteristic", *Ecology and Energy Systems Research Center, SANYO Electric Co., Ltd.*, Tochigi 326–8534, Japan, pp. 141–144 (date unknown).

*Primary Examiner*—Duane Smith
*Assistant Examiner*—Jason M. Greene
(74) *Attorney, Agent, or Firm*—Merchant & Gould P.C.

(57) ABSTRACT

A filter assembly for removing particulate contaminants and chemical contaminants from an incoming dirty air stream for a fuel cell. The filter assembly also includes a noise suppression element that reduces sound waves or noise emanating from any equipment, such as a compressor. The filter assembly can include a particulate filter portion for removing physical or particulate contaminants, a chemical filter portion for removing chemical contaminants, or can have both portions.

17 Claims, 26 Drawing Sheets

U.S. PATENT DOCUMENTS

| | | | | |
|---|---|---|---|---|
| 3,861,894 A | * | 1/1975 | Marsh | 96/121 |
| 3,925,043 A | * | 12/1975 | Matrone et al. | 96/136 |
| 4,080,791 A | | 3/1978 | Nadler et al. | |
| 4,129,426 A | * | 12/1978 | Furasen | 96/136 |
| 4,595,642 A | | 6/1986 | Nakanishi et al. | |
| 4,737,173 A | * | 4/1988 | Kudirka et al. | 96/381 |
| 4,909,815 A | * | 3/1990 | Meyer | 55/473 |
| 5,013,617 A | | 5/1991 | Scheffler | |
| 5,139,546 A | * | 8/1992 | Novobilski | 55/473 |
| 5,156,925 A | | 10/1992 | Lapp | |
| 5,189,092 A | | 2/1993 | Koslow | |
| 5,221,586 A | | 6/1993 | Morimoto et al. | |
| 5,331,037 A | | 7/1994 | Koslow | |
| 5,372,617 A | | 12/1994 | Kerrebrock et al. | |
| 5,641,031 A | | 6/1997 | Riemer et al. | |
| 5,646,852 A | | 7/1997 | Lorenz et al. | |
| 5,662,184 A | | 9/1997 | Riemer et al. | |
| 5,672,399 A | * | 9/1997 | Kahlbaugh et al. | 55/527 |
| 5,792,227 A | * | 8/1998 | Kahlbaugh et al. | 55/487 |
| 5,792,247 A | | 8/1998 | Gillingham et al. | |
| 5,794,732 A | | 8/1998 | Lorenz et al. | |
| 5,837,393 A | | 11/1998 | Okamoto | |
| 5,853,441 A | * | 12/1998 | Groen et al. | 55/350.1 |
| 5,944,878 A | | 8/1999 | Lindhe | |
| 5,981,096 A | | 11/1999 | Hornburg et al. | |
| 6,007,930 A | | 12/1999 | Adams et al. | |
| 6,013,385 A | | 1/2000 | DuBose | |
| 6,033,301 A | * | 3/2000 | Suwa | 55/473 |
| 6,057,051 A | | 5/2000 | Uchida et al. | |
| 6,074,769 A | | 6/2000 | Johnssen | |
| 6,124,052 A | | 9/2000 | Katoh et al. | |
| 6,152,996 A | | 11/2000 | Linnersten et al. | |
| 6,190,432 B1 | | 2/2001 | Gieseke et al. | |
| 6,284,397 B1 | | 9/2001 | Barton | |
| 6,296,957 B1 | | 10/2001 | Graage | |
| 6,309,769 B1 | | 10/2001 | Haug | |
| 6,316,134 B1 | | 11/2001 | Cownden et al. | |
| 6,321,637 B1 | * | 11/2001 | Shanks et al. | 55/467 |
| 6,420,059 B1 | | 7/2002 | Surampudi et al. | |
| 6,432,177 B1 | | 8/2002 | Dallas et al. | |
| 6,436,562 B1 | | 8/2002 | DuBose | |
| 2001/0049036 A1 | | 12/2001 | Raiser | |

\* cited by examiner

FILTER ASSEMBLIES AND SYSTEMS FOR INTAKE AIR FOR FUEL CELLS

This application is a continuation-in-part application of U.S. patent application Ser. No. 09/879,441, filed Jun. 12, 2001, which is a continuation-in-part application of U.S. patent application Ser. No. 09/832,715, filed Apr. 11, 2001, both which are incorporated herein by reference.

FIELD OF THE INVENTION

The present disclosure is related to air filtering systems for removing particulate and chemical contaminants from intake air. In particular, the disclosure is directed to a filter assembly that removes particulate and chemical contaminants from the intake air of fuel cells, and that also provides sound attenuation.

BACKGROUND OF THE INVENTION

Practical and efficient generation of electrical energy has been sought since the discovery of electricity. Hydroelectric, fossil fuel and nuclear generation plants and batteries have long been used to supply our electrical power needs. Power generation by use of fuel cells is a relatively recent development that is rapidly gaining acceptance for both commercial and residential applications. As compared with conventional fossil fuel burning powered sources, they are relatively clean and efficient. Fuel cells are electrochemical devices that efficiently convert a fuel's chemical energy directly to electrical energy. They chemically combine a fuel and oxidant without burning, thereby eliminating many inefficiencies and most pollution of traditional combustion power systems.

A fuel cell operates in principle much like a battery. However, unlike a battery, a fuel cell does not run down or require recharging. It will continue to produce energy in the form of electricity and heat as long as fuel is supplied to it. In general, a fuel cell consists of two electrodes (an anode and a cathode) sandwiched around an electrolyte. For example, for a PEM fuel cell, hydrogen and oxygen are passed over the anode and cathode electrodes respectively in a manner that generates a voltage between the electrodes, creating electricity and heat, and producing water as the primary byproduct. The hydrogen fuel is supplied to the anode of the fuel cell. Some consume hydrogen directly, while others use a fuel reformer to extract the hydrogen from, for example, a hydrocarbon fuel such as natural gas, methanol, ethanol, or gasoline. Oxygen enters the fuel cell at the cathode. The oxygen can be supplied in purified form or can come directly from atmospheric air.

The fuel cell uses a catalyst to cause the hydrogen atom to split into a proton and an electron, each of which takes a different path to the cathode. The protons pass through the electrolyte. The electrons create a useful electric current that can be used as an energy source, before returning to the anode where they are reunited with the hydrogen protons and the oxygen to form water.

Fuel cells are generally characterized by the electrolyte material which is sandwiched between the cathode and anode, and which serves as a bridge for ion exchange. There are five main known types of fuel cells. Alkaline fuel cells (AFCs) contain a liquid alkaline electrolyte and have been used primarily in space mission applications. Proton exchange membrane fuel cells (PEMFCs) contain a solid polymer electrolyte. Their low temperature operation, high power density with the ability to vary their output quickly to meet shifts in power demand make their use ideal for both mobile and stationary applications, such as powering vehicles or buildings. Phosphoric acid fuel cells (PAFCs) utilize a phosphoric acid electrolyte and are currently used for commercial power generation. Molten carbonate fuel cells (MCFCs) contain a carbonate salt electrolyte, which becomes molten at the operating temperature of about 650° C. Solid oxide fuel cells (SOFCs) use a ceramic electrolyte material and operate up to about 1000° C. Both the MCFCs and the SOFCs can use carbon monoxide as fuel.

Fuel cells have a vast range of potential applications. They can be used to produce electricity for homes, businesses and industries through stationary power plants. Fuel cells produce a direct current (dc) that must be inverted to alternating current for grid-connected applications or for use with most consumer products. However, future fuel cells could be operated in both grid-connected and non-grid-connected modes. For residential applications, smaller fuel cell power plants could be installed for the production of both heat and power. They could also be used to provide power to remote residential entities having no access to primary grid power, potentially eliminating the necessity of grid-connections.

In addition to the larger scale power production applications, fuel cells could replace batteries that power consumer electronic products such as laptop computers, cellular phones and the like and could even be micromachined to provide power directly to computer chips. Another promising commercial application of fuel cells is their potential to replace the internal combustion engine in vehicle and transportation applications. The applications for fuel cells are virtually unlimited.

All of the known fuel cell configurations discussed above have a common need for oxygen as an integral ingredient for performing the cell's chemical process. Other power sources, such as internal combustion engines, including diesel engines, also have a need for oxygen. For most commercial applications it is desirable for such oxygen to be supplied directly from the atmospheric air. However, it is accepted that in today's world, all atmospheric air has some degree of contaminants present in it. Such contaminants can be relatively large such as loose debris, insects, tree blossoms or the like, or can be in the nature of small particulates suspended in the atmosphere such as dust, tree pollen, smog or smoke particulates. Chemical contaminants are also widely present in atmospheric air, whether as a result of man-made pollution or as those which naturally occur. Typical chemical contaminants might include volatile organic compounds such as aromatic hydrocarbons, methane, butane, propane and other hydrocarbons as well as ammonia, oxides of nitrogen, ozone, smog, oxides of sulfur, carbon monoxide, hydrogen sulfide, etc. Such contaminants may appear intentionally (such as in military environments or by terrorists) or unintentionally. Solution of the latter requirement becomes particularly acute when the fuel cell is used in a mobile application that subjects the fuel cell to many varied atmospheric conditions.

Since efficient fuel cell operation depends on a delicately balanced chemical reaction, contaminants in the air used by the cell can have a significant adverse effect on the cell's operation and, depending on their nature, can even cause the fuel cell to discontinue operation. It is important therefore, that the fuel cell system include a filtration system that is designed to eliminate harmful contaminants and one that enables the fuel cell to be used in a wide range of use environments. It is also important that other power generating equipment have a filtration system that is designed to eliminate harmful contaminants.

To obtain the amount of oxygen necessary for a fuel cell and other equipment to produce the desired energy output, it has been found desirable to pass the oxygen-bearing containing air through air movement equipment such as a compressor or fan located within the air flow stream supplied to the fuel cell or other equipment. Unfortunately, typical compressors produce significant undesirable and annoying noise levels. It is desirable, therefore, in a power generating system to reduce and to minimize the noise produced by and/or transmitted through the compressor and back into the environment. Since reduced system size is also typically desirable, it is preferable that the filtration and sound attenuation features of the system be physically reduced as small as possible and even preferably be combined within a single element or housing. The present invention addresses the above-identified needs and desires for an efficient and quiet system for use in a wide variety of applications, including fuel cell systems.

What is desired, therefore, is a power generator, such as a fuel cell, that functions within environments having a wide range of contaminants.

SUMMARY OF THE DISCLOSURE

The present invention provides filter assemblies for filtering the intake air used in power generating systems, such as with fuel cells. The present invention addresses a number of issues associated with the practical implementation of fuel cell technology for power generation, whether that application is for generation of power in large stationary applications, vehicles, mobile lightweight equipment such as laptop computers or cell phones, or small stationary equipment such as radar detectors or sensors. These applications may draw less than 1 kW of power, or up to several megawatts of power. The filter assemblies of the present invention address the common need of generally all such applications, that is the need for a contaminant free supply of oxidant to the fuel cell, or at least a supply of oxidant having a reduced contaminant level.

The amount and types of contaminants desirous to be removed from the intake air will depend on the amount and types of contaminants initially present in the intake air (generally, the atmosphere or environment surrounding the fuel cell). The amount of contaminants and the type of contaminants present in the intake stream, prior to filtration, varies widely depending on the location of the fuel cell, or at least the location of the air intake. For example, some environments have large levels of particulate contamination such as dust, smog, smoke, or pollen, whereas other environments having large levels of chemical contaminants such as ammonia, carbon monoxide, sulfur dioxide, or silicone. Generally, no two environments will have identical contaminant profiles.

The amount and types of contaminants desirous to be removed from the intake air will also depend on the type of fuel cell. Any type of fuel cell or fuel cell stack can be used with the filter assemblies of the present invention, such as, for example, PEM fuel cells, solid oxide fuel cells, phosphoric acid fuel cells, and molten carbonate fuel cells. Typically, the higher temperature operating fuel cells, such as solid oxide fuel cells, can tolerate higher levels of organic contaminants than lower temperature operating fuel cells, such as PEM fuel cells.

Accordingly, one aspect of this invention is to provide filtration to the intake air for a fuel cell system. The assemblies of the present invention provide particulate filtration and/or chemical filtration to the incoming air stream to provide a purified oxidant supply. Since most fuel cell system include some type of air moving equipment, such as a compressor, which can introduce contaminants into the air stream, the present invention also addresses filtration of air downstream of the air moving equipment.

Unfortunately, air moving equipment typically produces loud noise in exchange for its air moving capabilities. It is the moving parts such as rotors, impellers, lobes, vanes, pistons and other various parts of air moving equipment that create sound waves or noise in the frequency ranges of 3 Hertz to 30,000 Hertz, sometimes as high as 50,000 Hertz, at levels of 85 to 135 db at one meter. While not all the noise emanating from the air moving equipment is objectionable, the various assemblies of the present invention are directed to reducing the most objectionable portions of the noise profiles.

In one particular embodiment, the invention is directed to a system for producing power. The system comprises an air filter assembly that comprises a housing and a filter element in the housing. The housing has an inlet and an outlet, the inlet accepting dirty atmospheric air to the filter assembly, and the outlet providing clean air from the filter assembly. The filter element comprises at least a physical or particulate filter portion to remove particulate contaminants from the dirty air. The filter element may also include a chemical filter portion to remove chemical contaminants from the dirty air. The filter assembly also includes a sound suppression or attenuation element, which may also be in the housing. The sound suppression element provides broadband attenuation of the sound passing through the filter assembly. The air filter assembly is operably connected to a power generation source, such as a fuel cell.

The system generally also includes air moving equipment, such as a compressor or a blower, to provide enhanced air flow to the fuel cell. The filter assembly is also particularly arranged to reduce the level of noise emanating from any such equipment.

The present invention provides a filter assembly, the filter assembly having a housing and a filter element in the housing. The housing has an inlet and an outlet, the inlet receiving dirty air into the filter assembly, and the outlet providing clean filtered air from the filter assembly. The filter assembly generally also has a sound suppression element, such as a resonator, sonic choke, full choke, sound adsorbent material, that attenuates or otherwise reduces sound passing through the housing by at least 3 db at one meter, preferably by at least 6 db.

The filter element can include a particulate filter portion, a chemical filter portion, and optionally a sound suppression element, all being part of the filter element. The sound suppression element provides broadband sound attenuation of at least 6 db at one meter. The particulate filter portion removes particulate contaminants from dirty air entering the filter element, and the chemical filter portion, if present, is removes chemical contaminants from the entering dirty air. The particulate filter portion can be positioned radially adjacent or forming a part of the sound suppression element. In some configurations, the particulate filter portion can be configured to provide straight-through flow.

Such a filter assembly or filter element can be used with any process or system that produces noise or sound and that benefits from cleaner intake gas (such as air). A fuel cell system is one power producing system with which filter assembly of the present invention can be used. Additionally, the filter assembly or filter element can be used with other power producing systems, such as diesel or gasoline engines.

DETAILED DESCRIPTION OF THE PREFERRED EMBODIMENT

Figure 1:
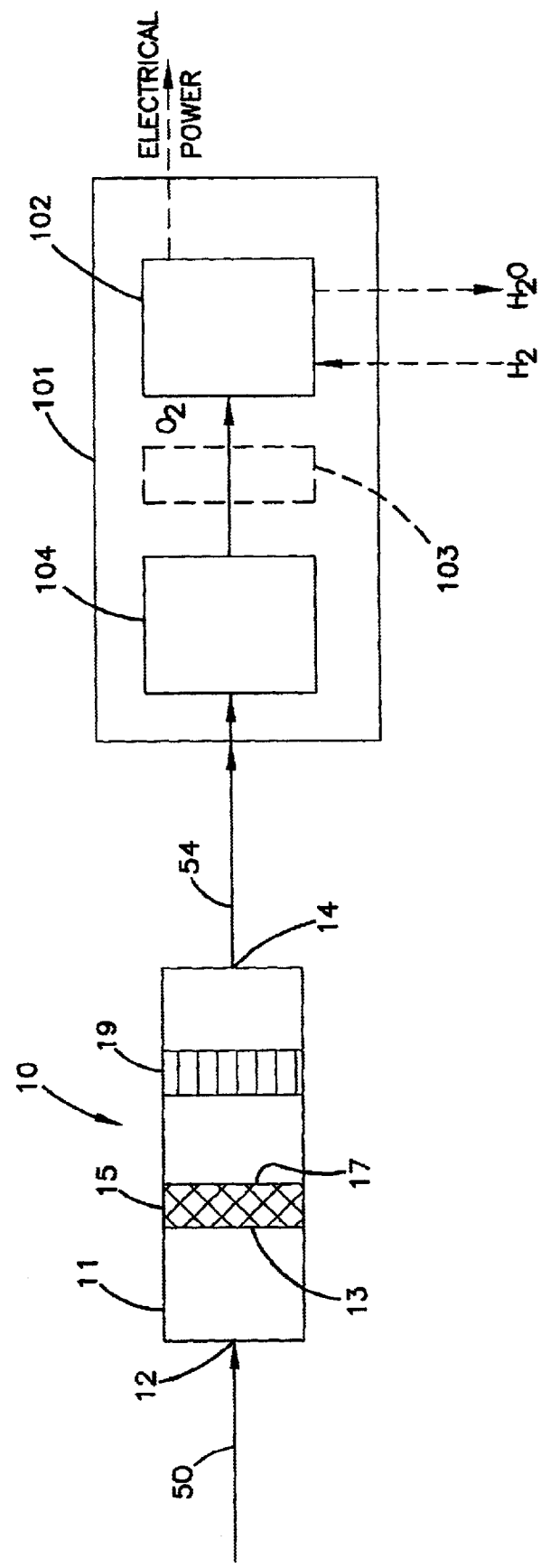
FIG. 1 is a schematic depiction of a power production system including a filter assembly of the present invention.

Referring to the figures, wherein like numerals represent like parts throughout the several views, there is schematically illustrated in FIG. 1, a filter assembly 10 is shown in combination with an assembly of equipment 1101. One application for the filter assembly 10 of the present invention is to remove contaminants from air being used by equipment 101. Another application of filter assembly 10 is to suppress noise or sound produced by and/or emanating from equipment 101.

As depicted in FIG. 1, atmospheric or ambient air 50 enters and is received by filter assembly 10 via an inlet 12. Prior to entering filter assembly 10, atmospheric air 50 generally contains various physical (e.g., particulate) and chemical contaminants and will be generally referred to herein as dirty air. Filter assembly 10 is constructed to remove various contaminants from dirty air 50 to provide clean air 54 that exits from an outlet 14 of filter assembly 10. Clean air 54 is the intake air for equipment 101. In the embodiment depicted in FIG. 1, equipment 101 includes a fuel cell 102. Fuel cell 102 uses oxygen from the intake air 54, combined with a fuel source such as hydrogen ($H_2$) to generate power. Water ($H_2O$) is a by-product of the oxygen and hydrogen reaction that occurs within fuel cell 102.

Filter assembly 10 of the present invention has at least one filter element, schematically indicated at 15, for removing particulate and/or chemical contaminants.

Filter element 15 has a dirty air intake side 13 and a clean air outlet side 17. A housing 11 retains filter element 15 therein. Inlet 12 is in fluid communication with dirty air intake side 13, and housing outlet 14 is in fluid communication with clean air side 17 of filter element 15. Housing 11 may be of varied configurations, and preferably comprises at least two separable sections, so that access can be gained to the contained filter element 15. The multiple sections can be held together by latches, clamps, straps, or other suitable securing mechanisms. One preferred system for engaging two housing sections of a filter assembly could be that system disclosed in U.S. Pat. No. 6,051,042 (Coulonvaux), which is incorporated herein by reference. Another preferred system is disclosed in U.S. Pat. No. 5,755,842 (Patel et al.), also incorporated herein by reference.

Atmospheric air 50 enters filter assembly 10 as dirty air through inlet 12 in housing 11 and progresses to dirty air side 13 of filter element 15. As the air passes through filter element 15 to its clean air side 17, contaminants are removed by filter element 15 to provide filtered air. The filtered air, illustrated at 54, exits filter assembly 10 through housing outlet 14 and is used by equipment 101. The type and extent of contaminants removed from the air to provide filtered air 54 depends on the contaminants present in atmospheric air 50, the configuration of filter element 15, the type of fuel cell used, and the temperature of the environment in which the fuel cell is operating.

Filter assembly 10 also includes a noise suppression element 19 to reduce or suppress the level of noise or sound emanating from equipment 101 and passing back through filter assembly 10. Suppression element 19 may be positioned within housing 11, and in some embodiments, suppression element 19 is defined by the configuration and shape of housing 11.

In order to facilitate or enhance the rate of chemical reaction within a fuel cell, it is often desirable to introduce the oxygen bearing air 54 to the fuel cell under pressure, or at a faster rate than would be available by simple "exposure" of the fuel cell to air at atmospheric pressure. A compressor or blower may be used for this purpose. Therefore, according to one configuration, equipment 101 includes a compressor 104 that provides air to fuel cell 102 for use in the catalytic reaction. Compressor 104 is positioned upstream from fuel cell 102. By the term "upstream", it is meant that air flows from compressor 104 to fuel cell 102; conversely, fuel cell 102 is positioned "downstream" from compressor 104. Filter assembly 10, which includes noise suppression element 19, is also positioned upstream from compressor 104.

During operation of compressor 104, fast moving impellers, rotors or pistons generally present within compressor 104 emit sound, generally referred to as noise. This noise has a frequency that varies depending on the type and configuration of the compressor, but is typically in the range of 3 Hertz to 30,000 Hertz, and sometimes as high as 50,000 Hertz, at a level of 85 to 135 db at one meter. One particular type of compressor 104, a "Lysholm" twin screw compressor, available from Opcon Autorotor AB of Sweden, operates at and provides a noise output in the range of about 160 to 1100 Hertz. Every compressor has a noise or frequency distribution associated with its operation; this distribution will depend on the type of compressor (including the specific model of compressor), and could depend on variants such as the input and output flow rates, and environment temperature.

It is to be understood that such filter structures that will be described are illustrative only of specific embodiments of such structures that embody the principles of this invention, and that the scope of the invention is not to be limited by specifics of the particular described structures.

Noise from compressor 104 travels in any direction possible, such as downstream to and through fuel cell 102 as well as upstream to and through filter assembly 10. Filter assembly 10, particularly by means of its suppression element 19, reduces the level of sound traveling upstream from compressor 104 and out of the filter assembly intake 12 by at least 3 db at one meter, typically by at least 6 db, and preferably by at least 25 db. Various specific structures of filter assembly 10, including filter element 15 and noise suppression element 19, are described below.

A First Embodiment of a Filter Assembly

Figure 2:
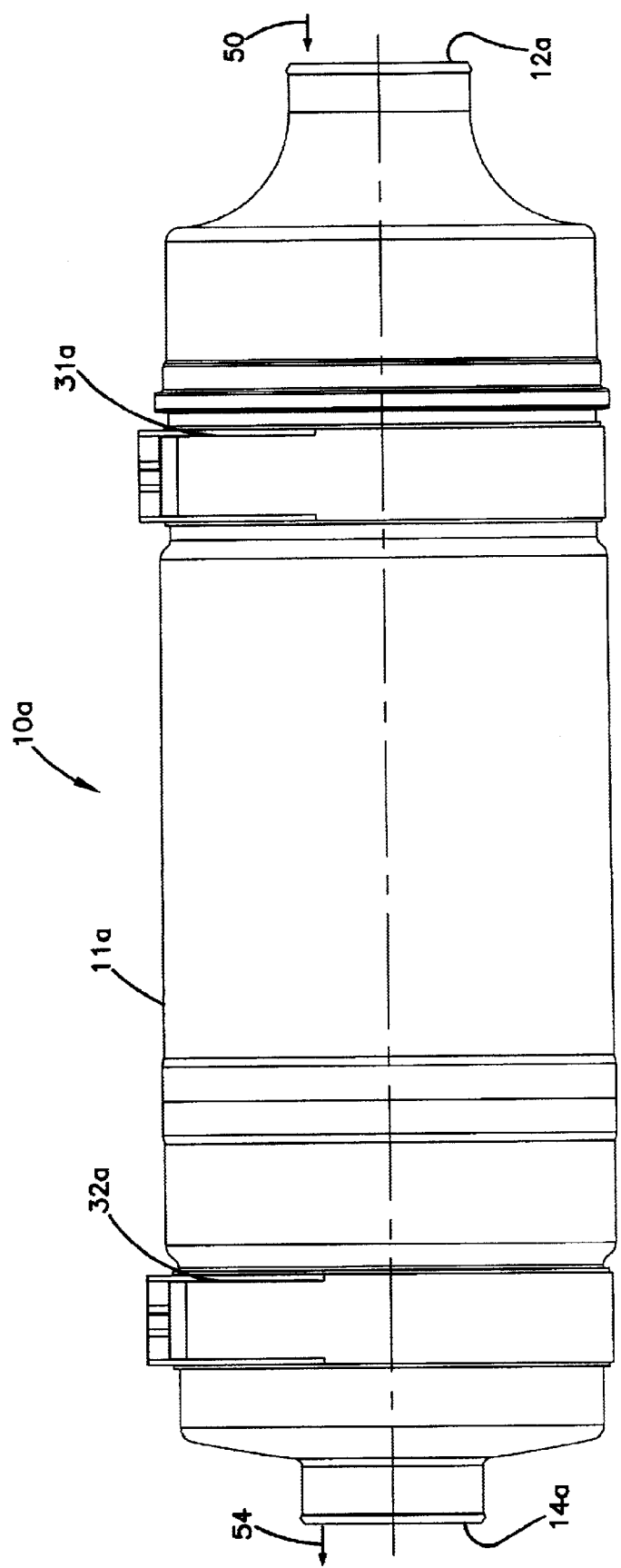
FIG. 2 is a front plan view of a first embodiment of the filter assembly of FIG. 1, configured according to the principles of the present invention.

A first example of a filter assembly configured according to the principles of this invention is shown in FIG. 2. For ease of identification, those elements in the embodiment of FIG. 2 that are the same or which perform the same function as comparable elements previously discussed with respect to the diagrammatic representation of FIG. 1 are followed by an alphabetic designation (i.e., "a") in FIG. 2. The same will be used when describing further embodiments, such as the embodiment of FIG. 12, wherein the reference numerals are followed by an alphabetic designation (i.e., "b").

Figure 3:
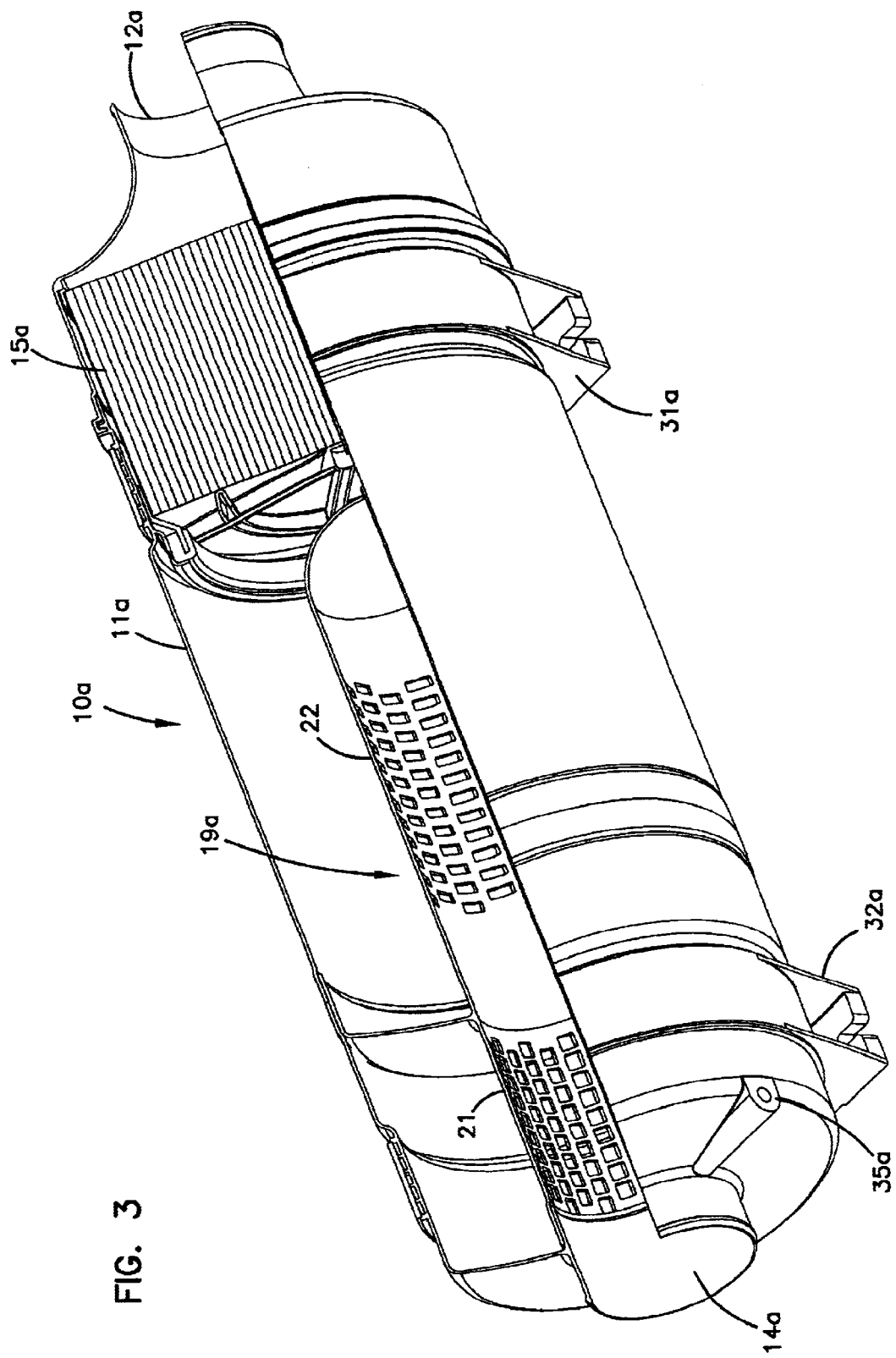
FIG. 3 is a fragmented cross-sectional perspective view of the filter assembly of FIG. 2.

FIGS. 2 and 3 illustrate a filter assembly 10a for use in a fuel cell operated passenger bus using a stack of PEM fuel cells providing an overall power output of 200 kW. It should be understood that filter assembly 10a is specifically designed for such an application, i.e., a bus running on 200 kW, and that filter assemblies for other applications, such as, for example, other vehicles, stationary units, or portable electronic application, would be designed for those applications that are different in size, shape and configuration, and operating parameters without departing from the overall features of filter assembly 10a.

The filter assembly view of FIG. 2 is illustrated as rotated about its central longitudinal axis, with respect to the illustration of FIG. 3, by 180 degrees.

Filter assembly 10a includes a generally cylindrical housing 11a which defines an air inlet 12a and an air outlet 14a. Dirty air 50 enters filter assembly 10a via inlet 12a, and clean air 54 exits via outlet 14a. The exterior of housing 11a may include mounting brackets 31a, 32a for positioning and securing filter assembly 10a in relation to surrounding equipment and structures. A sensor receptor port 35a is present on the exterior of housing 11a adjacent outlet 14a. Filter housing 11a may assume any number of physical shapes other that cylindrical; for example, filter assembly 10a may have a cross-sectional shape that is oval or obround, square, rectangular, or any other closed shape.

Housing 11a can be made from any material that can be formed with the desired elements, e.g., inlet 12a, outlet 14a, etc. Examples of usable materials for housing 11a include metals or plastics or other polymeric materials. Typically, housing 11a will be a thermoplastic or thermoset polymeric material, such as epoxy, polycarbonate, polyethylene, and the like. These materials may include reinforcement, such as a scrim or fibers, within the polymeric material to strength housing 11a. In some embodiments it may be desired to avoid silicone mold release when making housing 11a or any other part or element of filter element 10a, as silicone fumes may be detrimental to the fuel cell. Alternately, it may be possible to wash or otherwise cleanse housing 11a to remove any contaminants such as mold release.

Returning to the features of housing 11a, receptor port 35 is configured to cooperatively receive a sensor that can monitor parameters, as desired, within the housing internal cavity. One example of a sensor that may be desired for use within sensor receptor port 35a is an air mass flow sensor, generally referred to as a flow sensor or a flow meter. An air mass flow sensor can be used to monitor the mass of air passing through outlet 14a. The air mass passing through outlet 14a is directly related to the air mass passing through the entire system, including filter assembly 10a and equipment 101 of FIG. 1 (such as compressor 102, fuel cell 104, and optional exhaust apparatus 103). By monitoring any changes, specifically decreases, in air mass flow passing through filter assembly 10a, the life of any physical or particulate filter within filter assembly 10a or any other equipment in the system can be estimated. Alternately, a sensor can be used to monitor the level or accumulation of chemical contaminants that are passing through outlet 14a. By monitoring the amount of chemical contaminants passing through outlet 14a, the remaining life of any chemical filter within filter assembly 10a can be estimated.

One example of a preferred air mass flow sensor is a "hot wire" sensor, which uses the change in resistance through a wire to determine the amount of air passing over the wire. Such a hot wire sensor is available, for example, from TSI of St. Paul, Minn. Examples of devices that can monitor the accumulation or total contaminants include those disclosed in U.S. Pat. Nos. 5,976,467 and 6,187,596, both to Dallas et al. and incorporated herein by reference.

The various portions of filter assembly 10a are illustrated in FIG. 3, where a cut-away view of filter assembly 10a is provided. Operatively positioned within housing 11a are a filter element 15a and a noise suppression element 19a.

Suppression element 19a is configured to attenuate sound waves passing through the internal cavity defined by housing 11a. In the preferred embodiment suppression element 19a comprises a first resonator 21 and a second resonator 22. In the preferred embodiment of the invention herein described, first resonator 21 is configured to attenuate sound at a peak frequency of about 900 Hz, and second resonator 22 is configured to attenuate sound at a peak frequency of about 550 Hz. Detailed information regarding sound suppression element 19 (FIG. 1), suppression element 19a, and resonators 21, 22 hereinafter described in more detail.

Figure 4:
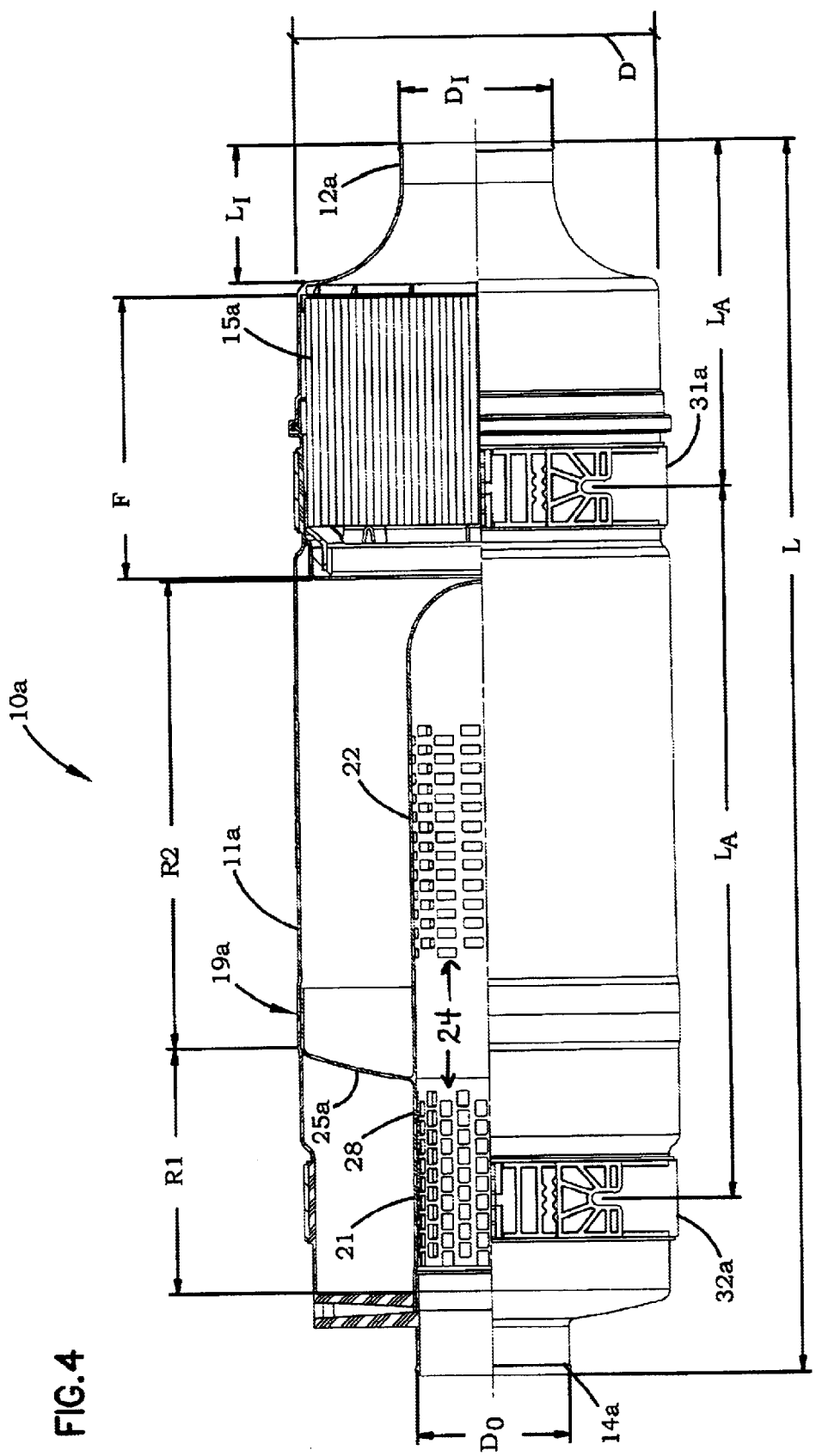
FIG. 4 is a fragmented cross-sectional front plan view of the filter assembly of FIG. 3.

Specific characteristics of a preferred configuration of the filter assembly 10a are illustrated in FIG. 4. Filter assembly 10a, specifically housing 11a, has a length "L" no greater than about 1500 mm, preferably no greater than about 1000 mm. In one preferred embodiment, length "L" is no greater than 32 inches (813 mm) long. Filter assembly 10a, which is generally cylindrical, has a diameter "D" no greater than about 18 inches (460 mm), preferably no greater than about 16 inches (406 mm). In the preferred embodiment, diameter "D" is no greater than 10 inches (254 mm). Length "L" and diameter "D" are generally dependent on the amount of volume allocated for occupation by filter assembly 10a within the system with which the filter assembly will be used. Such system requirements may be dictated by the space requirements of the application with which the system will be employed.

Air flows into filter assembly 10a via inlet 12a, which has a diameter "$D_I$" of about 1 to 8 inches (25 to 203 mm). In the preferred embodiment, inlet diameter "$D_I$" is about 4 inches (102 mm). The length of inlet 12a "$L_I$", measured as the distance from the inlet end of housing 11a to approximately the dirty air side of filter element 15a, is generally about 1 to 8 inches (25 to 203 mm). In the preferred embodiment, "$L_I$" is about 3.5 inches (90 mm). Outlet 14a has a diameter "$D_O$" of about 1 to 8 inches (25 to 203 mm). In the preferred embodiment, outlet diameter "$D_O$" is about 4 inches (102 mm).

Filter element 15a occupies a volume within housing 11a having a length "F" of about 4 to 8 inches (102 to 203 mm). The specific length "F" occupied by filter element 15a will be conditioned on features such as the type of filter element used, its filtering capabilities, the volume of housing 11a allotted to suppression element 19a (FIG. 3), and the overall length "L" of housing 11a. In the preferred embodiment, length "F" is about 7.3 inches (185 mm). Typically, the filter element 15a occupies the majority of the diameter D where filter element 15a is positioned.

Noise suppression element 19a occupies the majority of the remaining length of housing 11a. In the embodiment shown in FIGS. 3 and 4, suppression element 19a comprises a first resonator 21 and a second resonator 22. First resonator 21 occupies a length "$R_1$" of about 6.4 inches (163 mm) and second resonator 22 occupies a length "$R_2$" of about 12.2 inches (310 mm). The number of resonators used and the specific lengths (e.g., $R_1$ and $R_2$) occupied by the resonators are a function of the desired sound attenuating properties of the resonator. That is, the frequency of the sound attenuated by the resonators is dependent on the configuration of the resonators, specifically, the volume occupied. As stated, additional information regarding sound attenuation and resonators is provided below.

Mounting brackets 31a, 32a on the exterior of filter assembly 10a are spaced apart 18.5 inches (470 mm), which is designated by "$L_B$". First mounting bracket 31a is spaced 8.9 inches (227 mm) from inlet 12a, designated by "$L_A$". It is understood that the positioning of any mounting brackets is dependant on the overall length "L" of filter assembly 10a, its desired positioning in respect to surrounding equipment or structures, and positioning of internal baffles or other structure within housing 11a.

Physical or Particulate Removal Portion of the Filter Assembly

Filter assembly 10 of the present invention, in particular filter element 15, includes a portion for removing physical contaminants such as particulates from the incoming air 50. It is understood that large items, such as leaves, birds, rodents and other debris, will be removed by a screen, mesh, separator or the like from incoming atmospheric air 50 prior to the air reaching filter assembly 10. A water or liquid separator may be included to remove water or fluid from air 50 prior to entering filter assembly 10 as is known in the art.

A series of particulate removal portions may be used within filter assembly 10, with each subsequent particulate removal portion removing a smaller sized particle. Alternately, a single particulate removal portion can be used.

Typically, the particulate removal portion contains a filter media, such as a fibrous mat or web, including cellulosic materials, to remove particles. Examples of particulates or particles removed by a particulate removal portion include dust, dirt, pollen, diesel particulate, insects, wood chips and sawdust, metal shavings, cosmic dust, and the like. Some particulates may be doubly harmful to the operation of the fuel cell, both as the physical particle and the molecular structure of the particle; for example, limestone, is a basic material that could harm the electrolyte in a PEM fuel cell, which is acidic. Other types of fuel cells may be detrimentally affected by acidic contaminants.

Heavy hydrocarbons, particularly those found in road tar, can also detrimentally affect operation of a fuel cell.

The filter media can be treated in any number of ways to improve its efficiency in removing minute particulates; for example, electrostatically treated media can be used, as can cellulose or synthetic media or a combination thereof, having one or more layers of nanofiber, or other types of media known to those skilled in the art. For details regarding types of nanofiber that could be used, see for example, U.S. Pat. No. 4,650,506 (Barris et al.), which is incorporated herein by reference.

It is understood that any number of particulate removal portions having any combination of particulate removal efficiency can be used. The desired particulate removal system will depend on the type, size and nature of contaminants present in the atmosphere (for example, leaves, cottonwood blossoms, lint, snow, cosmic dust, etc.) and the desired cleanliness level of the resulting filtered air. The media used in filter element 15 can vary, depending on the particulate removal efficiency desired, the maximum level of acceptable pressure drop through filter element 15, and other such factors.

Figure 5:
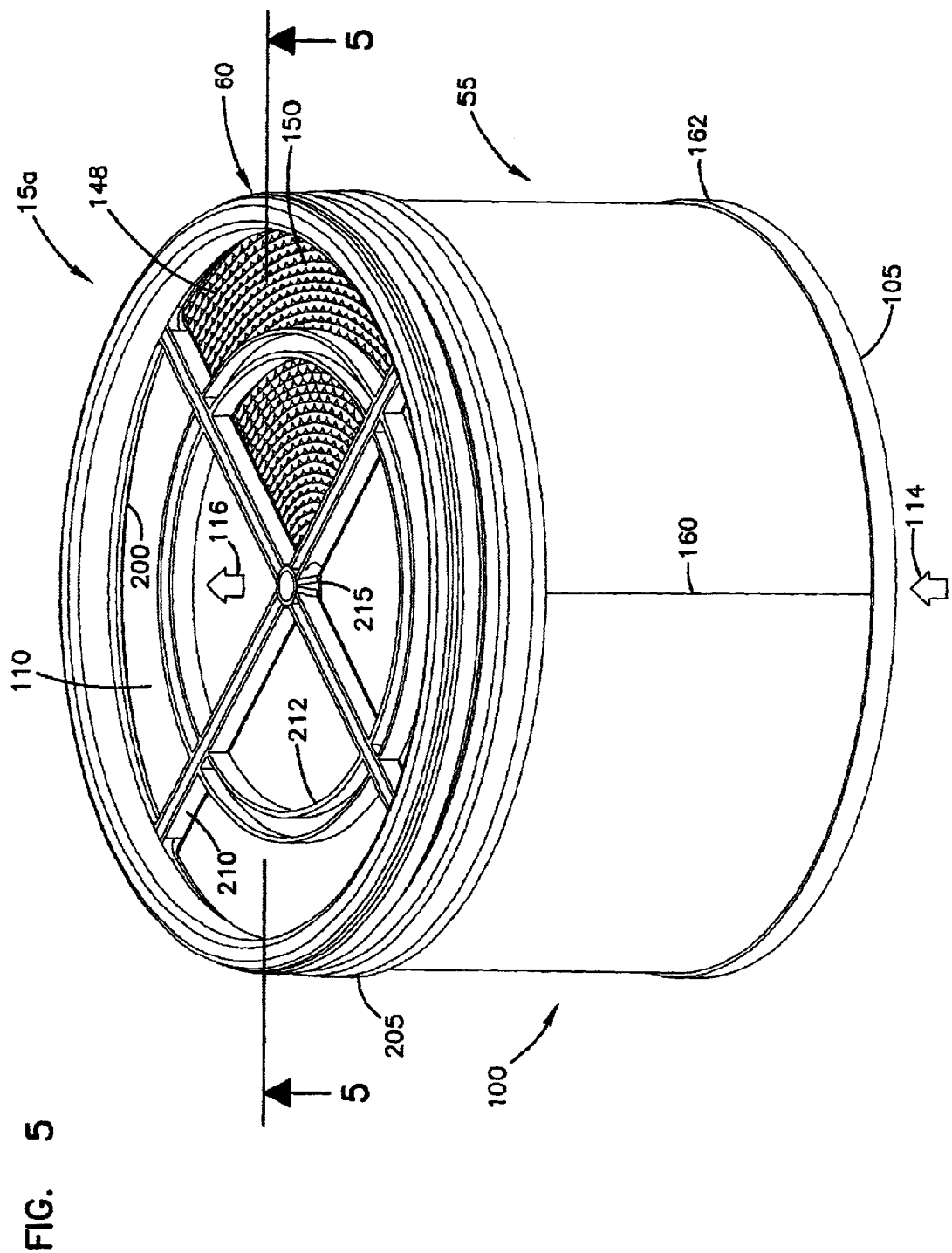
FIG. 5 is a perspective view of one embodiment of the filter element portion of the filter assembly of FIGS. 3 and 4, configured according to the principles of the present invention.

Filter element 15a of FIGS. 3 and 4 is illustrated in more detail in FIG. 5. In the preferred embodiment, filter element 15a includes filter media 55 that is wound about a central axis to form a cylindrically shaped filter element. The filter element includes a sealing system generally indicated at 60. One preferred sealing system is disclosed, for example, in U.S. Pat. No. 4,720,292, which is incorporated herein by reference.

In preferred constructions, filter media 55 is designed to remove particulate from air passing through the filter media 55, while the sealing system 60 is designed to provide a seal between filter element 15a and the interior sidewalls of housing 11a, as shown in FIGS. 3 and 4. By the term "seal," it is meant that sealing system 60, under normal conditions, prevents unintended levels of air from passing through a region between the outer surface of filter element 15a and the interior sidewall of housing 11a; that is, sealing system 60 inhibits air flow from avoiding passage through filtering media 55 of filter element 15a.

In certain preferred arrangements, filter media 55 is configured for straight-through flow. By "straight-through flow," it is meant that filter media 55 is configured so as to have a first flow face 105 (corresponding to an inlet end, in the illustrated embodiment) and an opposite, second flow face 110 (corresponding to an outlet end, in the illustrated embodiment). Straight-through flow is often desired because a straight-through flow filter can handle greater amounts of air passing therethrough compared to, for example, a pleated filter. It is intended that there is no distinction between "straight-through flow" and "in-line flow". Air enters in one direction 114 through first flow face 105 and exits in the same direction 116 from second flow face 110. In this embodiment, first flow face 105 correlates to dirty air side 13 of the filter element of FIG. 1 and second flow face 110 correlates to clean air side 17 of the filter element of FIG. 1.

When filter element 15a is used with an in-line flow housing such as housing 11a of FIGS. 3 and 4, in general, the air will enter through inlet 12a of housing 11a in one direction, enter filter element 15 a through first flow face 105 in the same direction, exit filter element 15a in the same direction from second flow face 110, and exit housing 11a through outlet 14a also in the same direction.

Although first flow face 105 is described above as corresponding to an inlet end (and dirty air side 13), and second flow face 110 is described above as corresponding to an outlet end (and clean air side 17), the inlet and outlet ends (and dirty air side and clean air side) can be reversed. That is, first flow face 105 depicted in FIG. 5 can correspond to an outlet end, while second flow face 110 depicted in FIG. 5 can correspond to an inlet end. In other words, the physical orientation of filter element 15a relative to the direction of air flow therethrough could be reversed.

In FIG. 5, first flow face 105 and second flow face 110 are depicted as planar and as parallel to one another. In other embodiments, first flow face 105 and second flow face 110 can be non-planar, for example, frusto-conical. Further, first flow face 105 and second flow face 110 need not be parallel to each other.

In the preferred embodiment, the media of filter element 15a is a wound or rolled construction. That is, filter element 15a will typically include a layer of filter media that is wound completely or repeatedly about a central axis. Typically, the wound construction will be a coil, in that a layer of filter media will be rolled in a series of turns around a central axis. In arrangements where a wound, coiled construction is used, filter element 15a will be in the shape of a roll of filter media, typically permeable fluted filter media.

Figure 6:
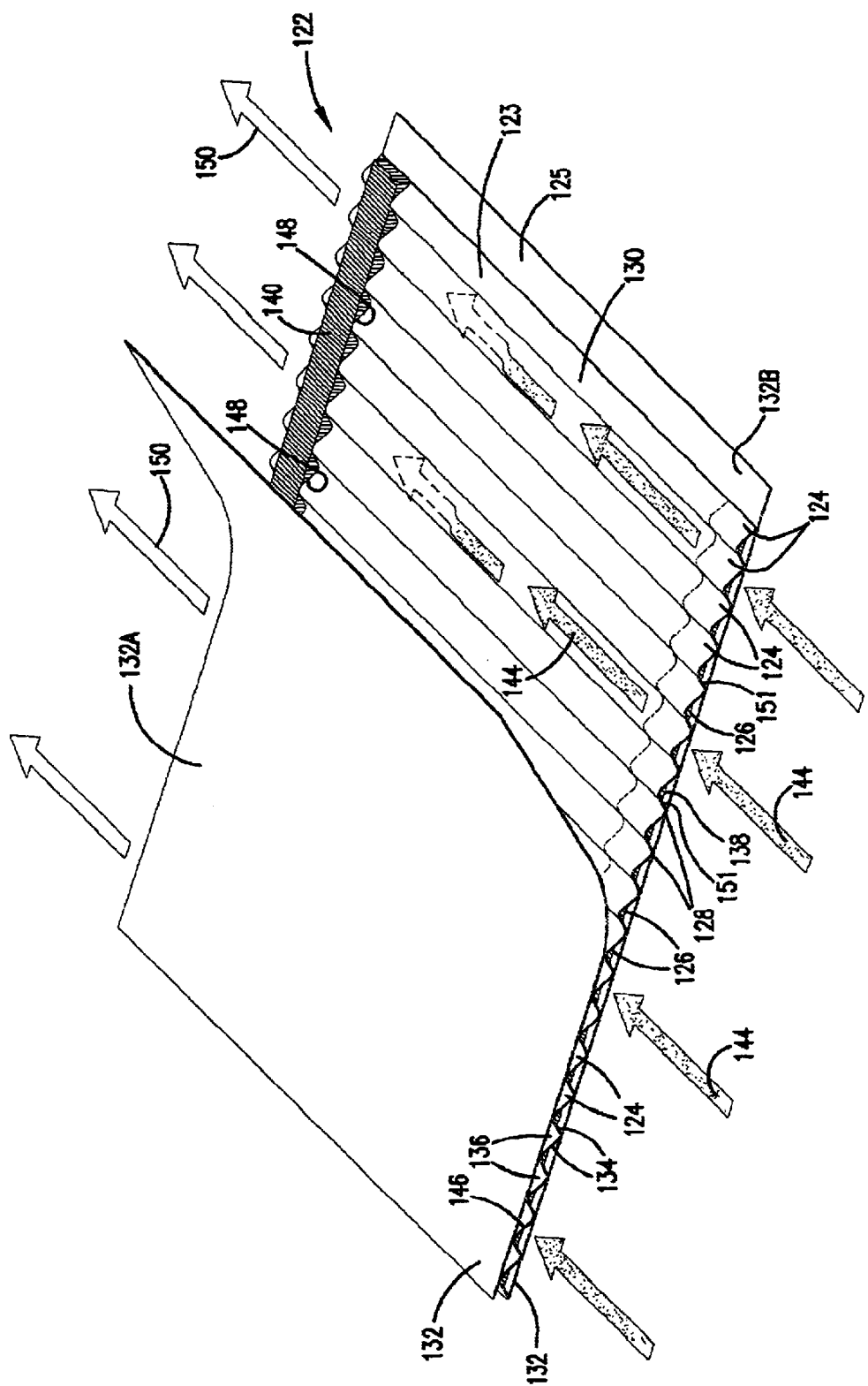
FIG. 6 is a schematic, perspective view of a portion of filter media usable in the filter element of FIG. 5.

Attention is now directed to FIG. 6, where a schematic, perspective view demonstrating the principles of operation of certain preferred media usable in the filter constructions herein is illustrated. In FIG. 6, a fluted media construction is generally designated at 122. Preferably, fluted construction 122 includes a layer 123 of corrugations having a plurality of flutes 124 and a face sheet 132. The FIG. 6 embodiment shows two sections of face sheet 132, at 132A (depicted on top of corrugated layer 123) and at 132B (depicted below corrugated layer 123). Typically, the preferred media construction 125 used in arrangements described herein will include corrugated layer 123 secured to bottom face sheet 132B. When using this media construction 125 in a rolled construction, it typically will be wound around itself, such that bottom face sheet 132B will cover the top of corrugated layer 123. Face sheet 132 covering the top of corrugated layer 123 is depicted as 132A. It should be understood that in a "rolled" media configuration face sheet 132A and 132B are the same sheet 132.

When using this type of media construction 125, flute chambers 124 preferably form alternating peaks 126 and troughs 128. Peaks 126 and troughs 128 divide flutes 124 into an upper row and lower row. In the particular configuration shown in FIG. 6, the upper flutes form flute chambers 136 closed at the downstream end, while flute chambers 134 having their upstream end closed form the lower row of flutes. Fluted chambers 134 are closed by a first end bead 138 that fills a portion of the upstream end of the flute between fluting sheet 130 and second facing sheet 132B. Similarly, a second end bead 140 closes the downstream end of alternating flutes 136. In some preferred systems, both first end bead 138 and second end bead 140 are straight along all portions of the media construction 125, never deviating from a straight path. In some preferred systems, first end bead 138 is both straight and never deviates from a position at or near one of the ends of media construction 125, while second end bead 140 is both straight and never deviates from a position at or near one of the ends of media construction 125. Flutes 124, face sheet 132, and end beads 138, 140 provide media construction 125 that can be formed into filter element 15a.

When using media constructed in the form of media construction 125, during use, unfiltered air enters flute chambers 136 as indicated by the shaded arrows 144. Flute chambers 136 have their upstream ends 146 open. The unfiltered fluid flow is not permitted to pass through downstream ends 148 of flute chambers 136 because their downstream ends 148 are closed by second end bead 140. Therefore, the air is forced to proceed through fluting sheet 130 or face sheets 132. As the unfiltered air passes through fluting sheet 130 or face sheets 132, the air is cleaned or filtered. The cleaned air is indicated by the unshaded arrow 150. The air then passes through flute chambers 134 (which have their upstream ends 151 closed) to flow through the open downstream end 152 (FIG. 5) out fluted construction 122. With the configuration shown, the unfiltered air can flow through fluted sheet 130, upper facing sheet 132A, or lower facing sheet 132B, and into a flute chamber 134.

Typically, media construction 125 will be prepared and then wound to form a rolled construction 100 of filter media. When this type of media is selected for use, media construction 125 includes corrugated layer 123 secured with end bead 138 to bottom face sheet 132B (as shown in FIG. 6, but without top face sheet 132A). In these types of arrangements, media construction 125 will include a leading edge at one end and a trailing edge at the opposite end, with a top lateral edge and a bottom lateral edge extending between the leading and trailing edges. By the term "leading edge", it is meant the edge that will be initially turned or rolled, such that it is at or adjacent to the center or core of the rolled construction. The "trailing edge" will be the edge on the outside of the rolled construction, upon completion of the turning or coiling process.

The leading edge and the trailing edge should be sealed between corrugated sheet 123 and bottom face sheet 132B, before winding the sheet into a coil, in these types of media constructions 125. While a number of ways are possible, in certain methods, the seal at the leading edge is formed as follows: (a) corrugated sheet 123 and bottom face sheet 132B are cut or sliced along a line or path extending from the top lateral edge to the bottom lateral edge (or, from the bottom lateral edge to the top lateral edge) along a flute 124 forming a peak 126 at the highest point (or apex) of peak 126; and (b) sealant is applied between bottom face sheet 132B and corrugated sheet 123 along the line or path of cut. The seal at the trailing edge can be formed analogously to the process of forming the seal at the leading edge. While a number of different types of sealant may be used for forming these seals, one usable material is a non-foamed sealant available from H. B. Fuller, St. Paul, Minn.

When using media construction 125, it may be desired by the system designer to wind the construction 125 into a rolled construction of filter media, such as filter element 15a of FIG. 5. A variety of techniques can be used to coil or roll the media. It can be appreciated that non-round center winding members may be utilized for making other filtering media shapes, such as filter media having an oblong or obround, oval, rectangular, or racetrack-shaped profile.

Media construction 125 can also be wound without a mandrel or center core. One method of forming a coreless rolled construction is as follows: (a) troughs 128 of the first few corrugations of corrugated sheet 123 spaced from the leading edge are scored from the top lateral edge to the bottom lateral edge (or from the bottom lateral edge to the top lateral edge) to help in rolling construction 125; for example, the first four corrugations from the leading edge will have a score line cut along troughs 128; (b) bead 140 of sealant is applied along the top of corrugated sheet 123 along the lateral edge opposite from the lateral edge having end bead 138; (c) the leading edge is initially turned or rolled over against itself and then pinched together to be sealed with sealant bead 140; and (d) the remaining corrugated sheet 123 having bottom face sheet 132B secured thereto is coiled or rolled or turned around the pinched leading edge.

In other methods, coreless constructions can be made from media construction 125 by automated processes, as described in U.S. Pat. Nos. 5,543,007 and 5,435,870, each incorporated by reference herein. In still other methods, the media construction can be rolled by hand.

When using rolled constructions such as filter construction 100, the system designer will want to ensure that the outside periphery of construction 100 is closed or locked in place to prevent filter construction 100 from unwinding. There are a variety of ways to accomplish this. In some applications, the outside periphery is wrapped with a periphery layer. The periphery layer can be a non-porous, adhesive material, such as plastic with an adhesive on one side. When this type of layer is utilized, the periphery layer prevents filter construction 100 from unwinding and prevents air from passing through the outside periphery of filter construction 100, maintaining straight-through flow through filter construction 100.

In some applications, filter construction 100 is secured in its rolled construction by sealing the trailing edge of media construction 125 with an adhesive or sealant along a line 160 (FIG. 5) to secure the trailing edge to the outside surface of filter construction 100. For example, a bead of hot-melt may be applied along line 160.

Additionally or alternatively, a support band 162 can be provided around the outer perimeter of filter construction 100 to secure the trailing edge. In FIG. 5, support band 162 is shown positioned at first flow face 105.

Figure 7:
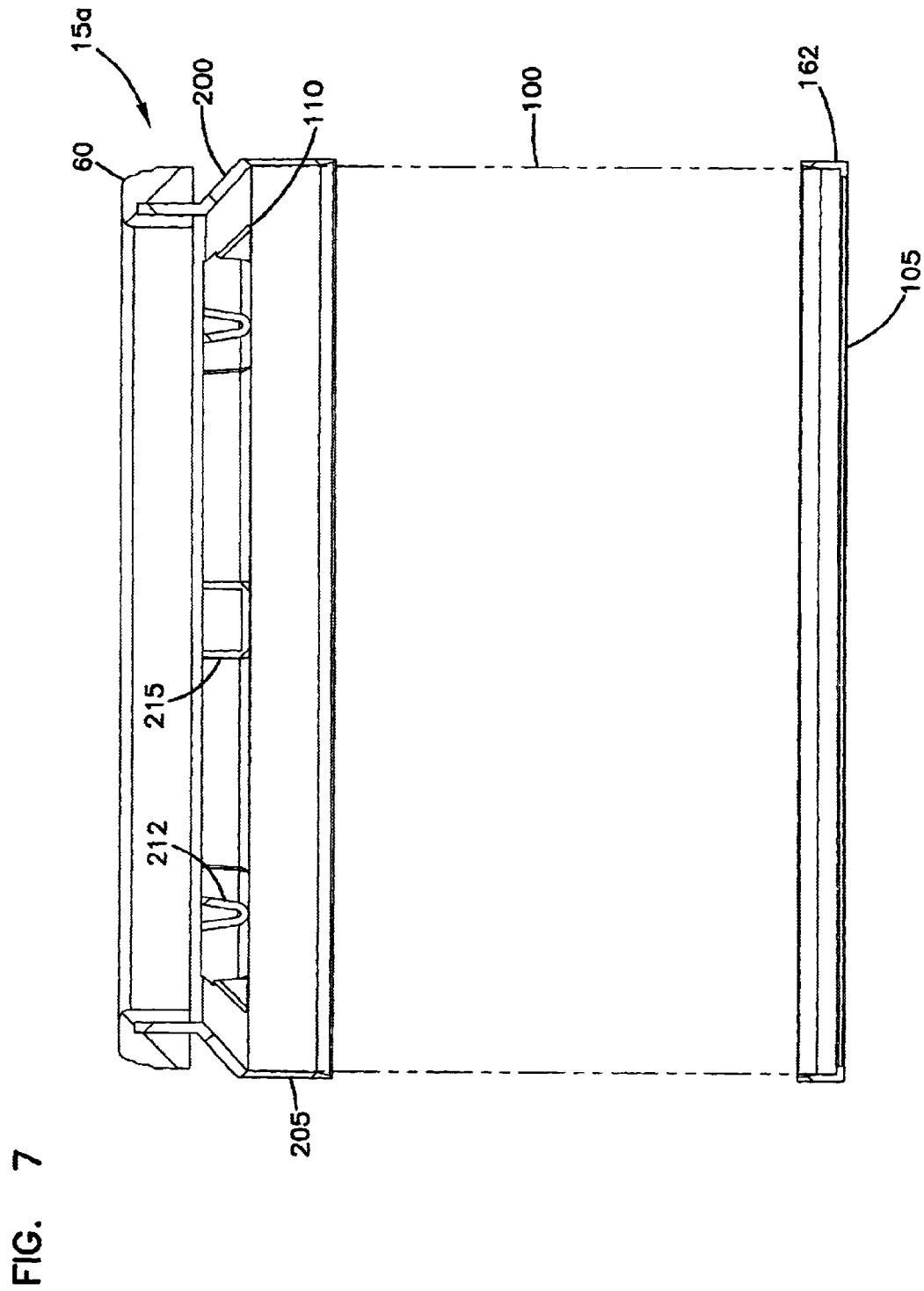
FIG. 7 is a fragmented cross-sectional view of the filter element of FIG. 5, taken along line 5—5 of FIG. 5.

Filter element 15a includes an end frame 200 positioned at second flow face 110. A cross-sectional fragmented view of filter element 15a is shown in FIG. 7; filter construction 100, with its various features, is shown in phantom. Referring to both FIGS. 5 and 7, frame 200 includes an outer annular peripheral band 205 and radial cross-braces 210. Cross-braces 210 extend inwardly from the outer peripheral band or collar 205 and meet at center 215 on the axis of the filter element. The cross-braces define an annular recessed seat portion when they meet at the center 215 of the frame 200. Peripheral band 205 extends along the outer perimeter of filter construction 100 at second flow face 110 and extends longitudinally distally away from second flow face 110. In the particular embodiment shown in FIGS. 5 and 7, frame 200 includes a second inner annular ring 212 that intersects and connects to the cross-braces 210.

End frame 200 supports sealing system 60 and provides a solid, relatively non-deformable surface to facilitate the seal between the filter element and filter housing formed by sealing system 60. In particular, sealing system 60 comprises an annular ring of round sealant material that is mounted to and seated on the distal portion of peripheral band 205 that projects outwardly from second flow face 110. Sealing system 60 is preferably a compressible material, such as a polyurethane foam material, that is configured to cooperatively engage the interior sidewalls of housing 11a and provide an air-tight seal. Sealing system 60 can have a stepped cross-sectional configuration of decreasing outermost diameter dimensions to facilitate sealing and to ensure a tight seal.

In general, for a properly functioning radially sealing structure, the compressible sealing system 60 needs to be compressed when filter element 15a is operatively mounted in housing 111a. In many preferred constructions, it is compressed about 15% to 40% (often about 20 to 33%) of its thickness, at the thickest portion thereof, to provide for a strong robust seal yet still be one that can result from hand installation of the element with forces on the order of 80 pounds or less, preferably 50 pounds or less, and generally from about 20–40 pounds.

Figure 8:
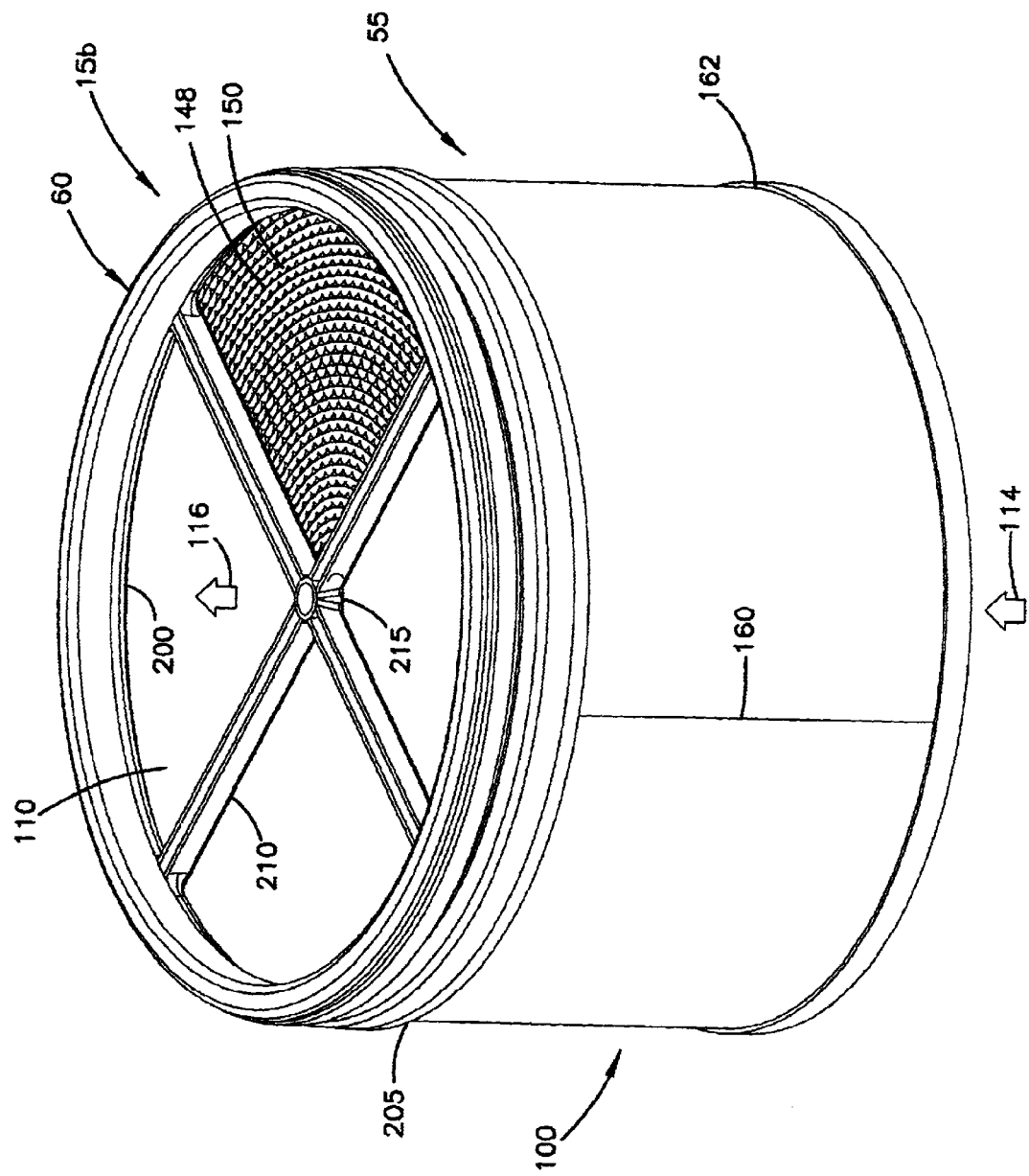
FIG. 8 is a perspective view of a second embodiment of a filter element, similar to that shown in FIG. 5, for use in the filter assembly of the present invention.

A second embodiment of a filter element for use in the filter assembly of the present invention is illustrated in FIG. 8 as filter element 15b. Filter element 15b is similar to filter element 15a of FIGS. 5 and 7, except that frame 200 of filter element 15b does not include inner annular ring 212.

Additional details regarding filter element 15a, filter element 15b, and other usable filter elements can be found in U.S. Pat. No. 6,190,432, which is incorporated herein by reference.

It is understood that other filter constructions, other than those having straight-through flow, can be used. Examples of other particulate filter constructions that can be used include pleated media filters, panel filters, filters having a volume of depth media, and the like.

A Chemical Removal Portion of the Filter Assembly

Referring again to FIG. 1, filter assembly 10 preferably also includes a portion designed to remove contaminants from the atmosphere by either adsorption or absorption. As used herein, the terms "adsorb", "adsorption", "adsorbent" and the like, are intended to also include the mechanisms of absorption and adsorption.

The chemical removal portion typically includes a physisorbent or chemisorbent material, such as, for example, desiccants (i.e., materials that adsorb or absorb water or water vapor) or materials that adsorb or absorb volatile organic compounds and/or acid gases and/or basic gases. The terms "adsorbent material," "adsorption material," "adsorptive material," "absorbent material," absorption material, "absorptive material," and any variations thereof, are intended to cover any material that removes chemical contaminants by adsorption or absorption. Suitable adsorbent materials include, for example, activated carbon, activated carbon fibers, impregnated carbon, activated alumina, molecular sieves, ion-exchange resins, ion-exchange fibers, silica gel, alumina, and silica. Any of these materials can be combined with, coated with, or impregnated with materials such as, for example, potassium permanganate, calcium carbonate, potassium carbonate, sodium carbonate, calcium sulfate, citric acid, phosphoric acid, other acidic materials, or mixtures thereof. In some embodiments, the adsorbent material can be combined or impregnated with a second material.

The adsorbent material typically includes particulates or granulated material and can be present in varied configurations, for example, as granules, beads, fibers, fine powders, nanostructures, nanotubes, aerogels, or can be present as a coating on a base material such as a ceramic bead, monolithic structures, paper media, or metallic surface. Typically, the adsorbent materials, especially particulate or granulated materials, are provided as a bed of material.

Alternately, the adsorbent material can be shaped into a monolithic or unitary form, such as, for example, a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process. Shaped adsorbent articles are taught, for example, in U.S. Pat. Nos. 5,189,092 (Koslow), and 5,331,037 (Koslow), which are incorporated herein by reference.

The binder used for providing shaped articles can be dry, that is, in powdered and/or granular form, or the binder can be a liquid, solvated, or dispersed binder. Certain binders, such as moisture curable urethanes and materials typically referred to as "hot melts", can be applied directly to the adsorbent material by, for example, a spray process. In some embodiments, a temporary liquid binder, including a solvent or dispersant which can be removed during the molding process, is used. Suitable binders include, for example, latex, microcrystalline cellulose, polyvinyl alcohol, ethylene-vinyl acetate, starch, carboxyl methyl cellulose, polyvinylpyrrolidone, dicalcium phosphate dihydrate, and sodium silicate. Preferably the composition of a shaped material includes at least about 70%, by weight, and typically not more than about 98%, by weight, adsorbent material. In some instances, the shaped adsorbent includes 85 to 95%, preferably, approximately 90%, by weight, adsorbent material. The shaped adsorbent typically includes not less than about 2%, by weight, binder and not more than about 30%, by weight, binder.

Another embodiment of a suitable adsorbent material for use in the chemical removal portion is an adsorbent material that includes a carrier. For example, a mesh or scrim can be used to hold the adsorbent material and binder. Polyester and other suitable materials can be used as the mesh or scrim. Typically, any carrier is not more than about 50% of the weight of the adsorbent material, and is more often about 20 to 40% of the total adsorbent weight. The amount of binder in the shaped adsorbed article with the carrier typically ranges about 10 to 50% of the total adsorbent weight and the amount of adsorbent material typically ranges about 20 to 60% of the total adsorbent weight.

The chemical removal portion can include strongly basic materials for the removal of acid contaminants from the air, or strongly acidic materials for the removal of basic contaminants from the air, or both. Preferably, the basic materials and acidic materials are sufficiently separated from each other so that they do not interact with or cancel each other. In some embodiments, the adsorbent material itself may be the strongly acidic or strong basic material. Examples of such materials include materials such as polymer particulates, activated carbon media, zeolites, clays, silica gels, and metal oxides. In other embodiments, the strongly acidic materials and the strongly basic materials can be provided as surface coatings on carriers such as granular particulate, beads, fibers, cellulosic material, fine powders, nanotubes, and aerogels. Alternately or additionally, the acidic and basic material that forms the acidic and basic surfaces may be present throughout at least a portion of the carrier; this can be done, for example, by coating or impregnating the carrier material with the acidic or basic material.

Examples of acidic compounds that are often present in atmospheric air and are considered as contaminants for fuel cells include, for example, sulfur oxides, nitrogen oxides, hydrogen sulfide, hydrogen chloride, and volatile organic acids and nonvolatile organic acids. Examples of basic compounds that are often present in atmospheric air and are considered as contaminants for fuel cells include, for example, ammonia, amines, amides, sodium hydroxides, lithium hydroxides, potassium hydroxides, volatile organic bases and nonvolatile organic bases.

For PEM fuel cells, the cathodic reaction occurs under acidic conditions, thus, it is undesirable to have basic contaminants present. An example of a preferred material for removing basic contaminants, such as ammonia, is activated carbon impregnated or coated with citric acid.

Figure 9:
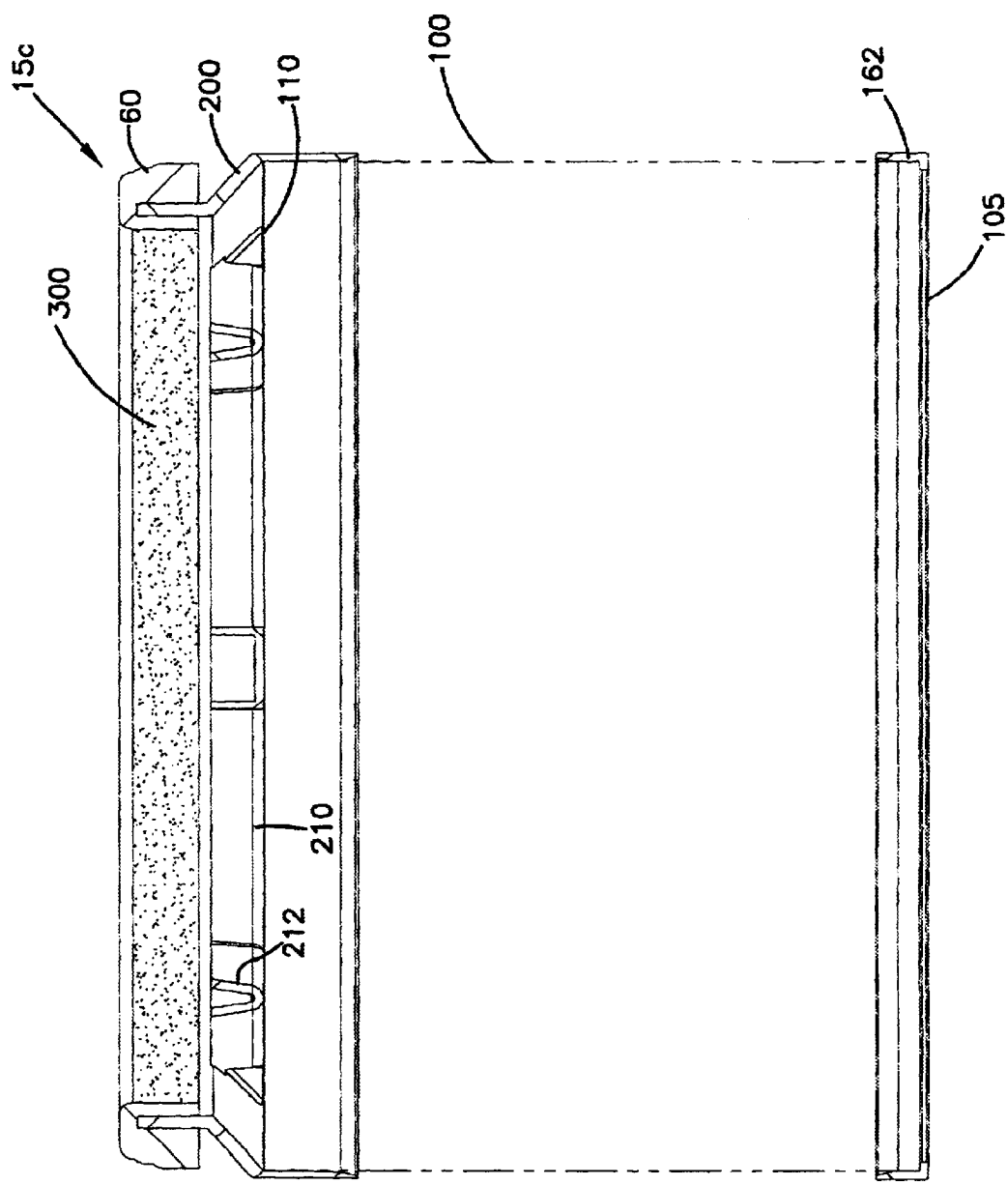
FIG. 9 is a fragmented cross-sectional view of a third embodiment of a filter element, similar to that shown in FIG. 7, for use in the filter assembly of the present invention.

A first embodiment of a filter element 15 (FIG. 1) having both the physical or particulate removal portion and a chemical removal portion is shown in FIG. 9 as filter element 15c. Filter element 15c is similar to filter element 15a of FIG. 7 in that filter element 15c has filter construction 100 (shown in phantom in FIG. 9) with first flow face 105 and second flow face 110, support band 162, frame 200, and sealing system 60. Filter element 15c further includes an adsorbent element 300, such as shaped activated carbon. Adsorbent element 300 is positioned on frame 200 within frame 200 and sealing system 60. The compressible sealing system 60 frictionally retains adsorbent element 300 in the desired position, but can be deformed to release adsorbent element 300 for replacement when the adsorbent is spent.

In a preferred embodiment, adsorbent element 300 is a shaped mass of activated carbon material held together by a thermoplastic binder. A preferred adsorbent element 300 includes activated carbon material, sieve size 12×20 or 8×16, molded with a level of 8% ethylene-vinyl acetate binder. Such a preferred adsorbent element 300 can be made in accordance with the teachings of U.S. Pat. Nos. 5,189,092 (Koslow) or 5,331,037 (Koslow). In another preferred embodiment, adsorbent element 300 is made from layers (not shown) of carbon material available from Hollingsworth & Vose of East Walpole, Mass. (also known as H&V).

In the embodiment shown, adsorbent element 300 is positioned adjacent second flow face 110; thus air flowing through filter element 15c would enter filter construction 100 via first flow face 105 and exit via second flow face 110, and then pass through adsorbent element 300. Such a configuration has adsorbent element 300 "downstream" of the particulate removing filter construction 100. All air passing through filter construction 100 preferably passes through adsorbent element 300. It is understood that adsorbent element 300 could alternatively be positioned "upstream" from filter construction 100.

Figure 10:
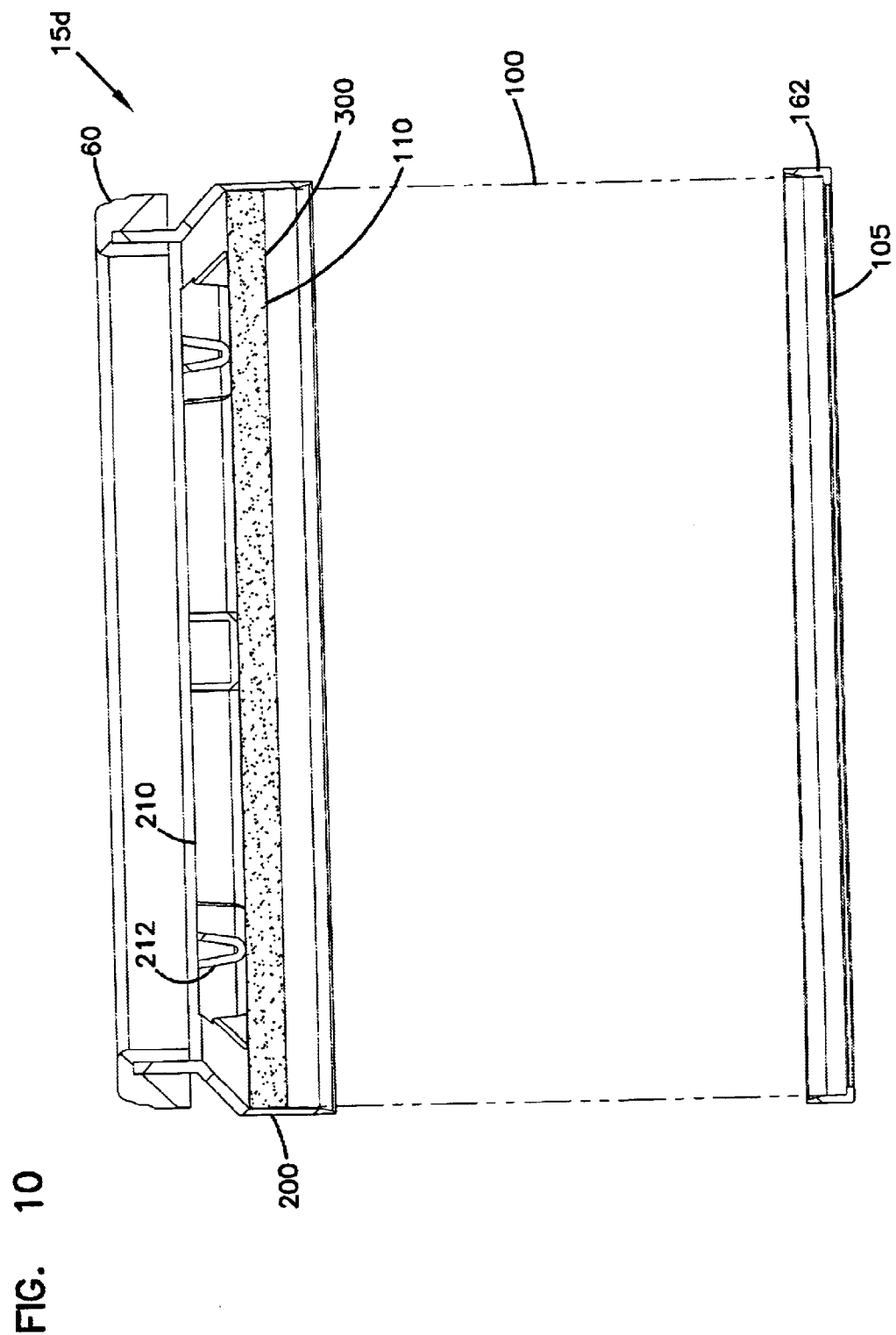
FIG. 10 is a fragmented cross-sectional view of a fourth embodiment of a filter element, similar to that shown in FIGS. 7 and 9, for use in the filter assembly of the present invention.

A second embodiment of a filter element 15 (FIG. 1) having both the physical or particulate removal portion and a chemical removal portion is shown in FIG. 10 as filter element 15d. Filter element 15d is similar to filter element 15a in that filter element 15d has filter construction 100 (shown in phantom) with first flow face 105 and second flow face 110, support band 162, frame 200, and sealing system 60. Filter element 15d further includes the adsorbent element 300, except that adsorbent element 300 is positioned between second flow face 110 and cross-braces 210 of frame 200. Peripheral band 205 (see FIG. 8) of frame 200 holds absorbent 300 against second flow face 110. Adsorbent element 300 may be permanently affixed to one or each of frame 200 and filter construction 100, or may be disengageable therefrom. Again, all air passing through second flow face 110 of filter construction 100 preferably also passes through adsorbent element 300.

In filter elements 15c and 15d, the chemical removal portion, specifically adsorbent element 300, has been combined with the particulate removal portion to form a single structure. It is understood that in some embodiments, the chemical removal portion will be separate and spaced from the particulate removal portion. It is further understood that the particulate removal portion and chemical removal portion can be combined in a single element that removes both physical and chemical contaminants. In one example, the filter media of a particulate removal portion can be made with fibers that have a surface treatment capable of chemisorbing or otherwise reacting or interacting with acidic or basic contaminants, thus providing a chemical removal portion. In another example, a bed of activated carbon granules can be arranged and configured to remove physical contaminants from the air if the spacing between the granules is sufficiently small.

One preferred filter element that includes both particulate and chemical removal portions is disclosed in U.S. Pat. No. 6,152,996 (Linnersten et al.), which is incorporated herein by reference.

Additional information regarding chemical removal portions of filter elements for use with fuel cell systems is disclosed in U.S. patent application Ser. No. 09/660,127, filed Sep. 12, 2000, which is incorporated herein by reference in its entirety.

A Sound Suppression Element of the Filter Assembly

Referring again to FIG. 1, filter assembly 10 of the present invention includes a noise or sound suppression element 19 to reduce or suppress the level of noise or sound emanating from equipment 101. Such noise reduction is preferably at least 3 db at one meter, typically at least 6 db, preferably at least 10 db, and most preferably at least 25 db. The catalytic reaction occurring within fuel cell 102 is a silent process, in that the hydrogen fuel, the reaction at the cathode, and the production of power, produce no sound audible by humans. Details regarding the construction and operation of fuel cells 102 are provided below. However, although fuel cell 102 is silent, the equipment or machinery often used to provide an increased flow of air to fuel cell 102, such as compressor 104 of FIG. 1, generally produce significant noise. Air moving equipment that may be used in conjunction with fuel cell 102 includes compressors, fans, blowers, and pumps.

Sound emanating from equipment such as compressor 104 will travel in any direction as permitted by the fuel cell, equipment and filter assemblies. That is, sound would travel upstream from the compressor, against the flow of the air, to filter assembly 10; and sound would travel downstream to fuel cell 102. In accordance with the present invention, filter assembly 10 reduces the noise emanating from compressor 104 through the filter assembly and out to the surrounding environment, by attenuating the sound with sound suppression element 19 of filter assembly 10.

Sound suppression element 19 can be any type of element that, together with other features of filter assembly 10 that may attenuate or otherwise reduce the sound, provides reduction in the sound by at least 3 db, typically at least 6 db, preferably by at least 10 db, and more preferably by at least 25 db. Examples of sound suppression elements 19 include mufflers, lined ducts, baffles, bends in the sound path, plenums, expansion chambers, resonators, sonic chokes, full chokes, sound adsorptive material, and various combinations thereof. Various details regarding sound suppression elements are disclosed, for example, in U.S. Pat. No. 6,082,487 (Angelo et al.), which in incorporated herein by reference.

Certain typical suppression elements 19 include an outer wall, usually cylindrical, defining an internal volume, and an inlet and outlet tube oriented within the internal volume of the outer wall. It is preferred that the outer wall and any other structures have minimal surfaces that are planar or flat; rather, it is preferred that the surfaces of suppression element 19 are curved, to reduce the amount of vibration or drumming that often occurs with flat walls. In typical arrangements, the outlet tube defines a sonic choke. An inner, perforated wall is spaced from the outer wall, to define an annular volume therebetween. The annular volume may include a packing or padding of absorptive material within the annular volume. This absorptive material within the annular volume provides an absorptive function, and also helps reduce drumming of the outer wall or shell. In certain arrangements, the inner perforated wall and annular volume are in alignment with the inlet region of suppression element 19. That is, the inner perforated wall may circumscribe at least a portion of the inlet tube.

A preferred suppression element 19 is a resonator. A resonator is an enclosed volume of air in communication with the exterior through a small opening. The enclosed air resonates at a finite range of frequency. This range of frequency and the level of attenuation depend on the dimensions of the enclosed volume. The frequency resonated within the enclosed volume determines the noise frequency attenuated by the resonator.

In filter assembly 10a illustrated in FIGS. 3 and 4, suppression element 19a comprises first resonator 21 and second resonator 22. Notice that first resonator 21 is positioned adjacent outlet 14a and second resonator 22 is positioned upstream or closer to inlet 12a. Such designated "first" and "second" positioning of the resonators has been selected because noise from equipment 101 (FIG. 1) would be moving upstream (opposite to the direction of air flow) through filter assembly 10a from outlet 14a to inlet 12a. First and second resonators 21, 22 can be designed to attenuate the same or a different range of sound frequencies.

Generally, if resonators 21, 22 remove the same range of noise frequency, the level of noise decrease will be greater. If resonators 21, 22 remove noise of different frequency ranges, the overall ranges of frequencies attenuated will be greater.

In one preferred embodiment, first resonator 21 is designed to attenuate sound at a peak frequency of about 900 Hz, and second resonator 22 is designed to attenuate sound waves at a peak frequency of about 550 Hz. As illustrated in FIGS. 3 and 4, various features differ between first resonator 21 and second resonator 22. For example, the volume occupied by second resonator 22 is much greater that that occupied by first resonator 21. The volume of first resonator 21 is generally defined by the interior walls of housing 11a between outlet 14a and an internal annular baffle 25a. The volume occupied by second resonator 22 is generally defined by the interior walls of housing 11a between internal baffle 25a and flow face 110 (FIG. 5) of the filter element. Additionally, the perforations within a central wall structure 28 vary between first resonator 21 and second resonator 22. For example, the shape and size of the apertures, the spacing between adjacent apertures, and their orientation differ between the two resonators. These various features of each resonator dictate the frequencies attenuated thereby. Design of resonators for desired frequency attenuation is well known in the art of sound suppression and attenuation and will not be detailed herein.

Additionally, first and second resonators 21, 22 are spaced approximately 3 inches (76 mm) apart, as measured by the longitudinal spacing between the perforations in central wall structure 28 of the two resonators. This distance between resonators 21, 22, designated at 24 in FIG. 4, will attenuate sound having a frequency whose ¼ wavelength is equal to this distance. A distance of approximately 3 inches (76 mm) provides a peak attenuation of about 1100 Hz.

Figure 11:
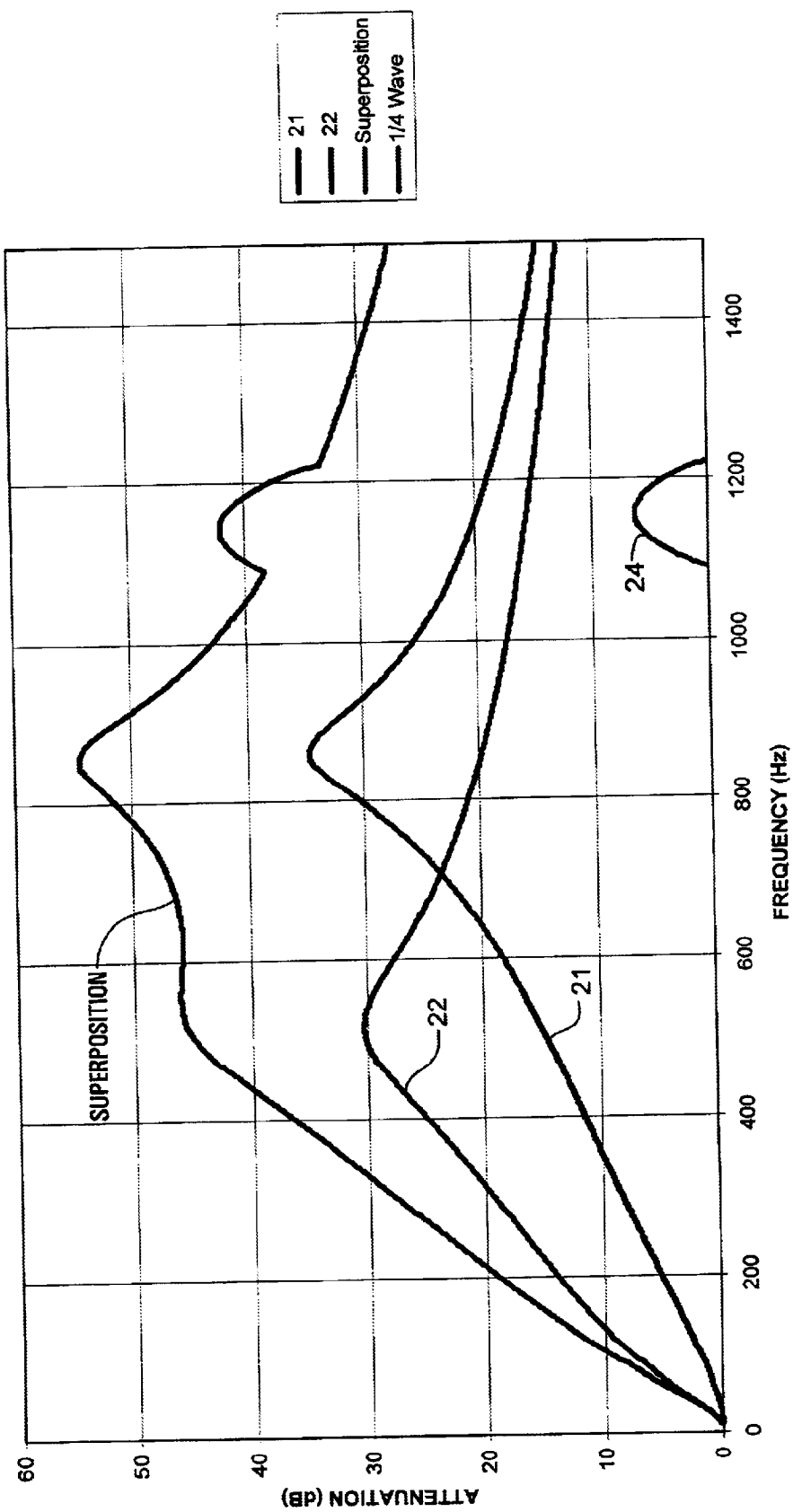
FIG. 11 is a graphical representation of sound attenuation versus frequency for the filter assembly of FIGS. 3 and 4.

FIG. 11 graphically illustrates the levels and frequencies of sound attenuated by the preferred embodiment described above. First resonator 21 attenuates sound at a peak frequency of about 900 Hz, second resonator 22 attenuates sound at a peak frequency of about 550 Hz, and the ¼ wavelength spacing 24 attenuates sound at about 1100 Hz. The composite sound attenuation of the three spans the fundamental frequencies of a typically twin-screw compressor, such as the 160 1100 Hz of a Lysholm twin screw compressor manufactured by Opcon.

Referring again to FIG. 1, suppression element 19 may be positioned within housing 11, and in some embodiments, suppression element 19 is defined by housing 11. In the embodiment of filter assembly 10a, first and second resonators 21, 22 are partially defined by housing 11a. The interior walls of housing 11a together with internal baffle 25, define the volume occupied by resonators 21, 22.

Various other features of housing 11a may provide sound attenuation. For example, inlet 12a, as illustrated in FIG. 4, has a bell shaped expansion in the axial direction from a 4 inch (102 mm) to 10 inch (254 mm) diameter. This expansion provides a broadband sound attenuation of approximately 3 db.

It is noted that filter element 15, such as any of filter elements 15a, 15b, 15c, 15d, may have additional sound attenuation properties associated with the particulate removal portion or the chemical removal portion. For example, filter construction 100 (FIGS. 5 and 7), may attenuate some frequencies a low amount, such as 1 db. Additionally, adsorbent element 300 (FIGS. 9 and 10) may attenuate some frequencies. It has been found that various shaped adsorbent elements, such as those taught by U.S. Pat. No. 5,189,092 (Koslow), and U.S. Pat. No. 5,331,037 (Koslow), provide some sound attenuation; the frequency attenuated and the level (i.e., db) will depend on the specific features of the shaped adsorbent element.

A Second Embodiment of a Filter Assembly

Figure 12:
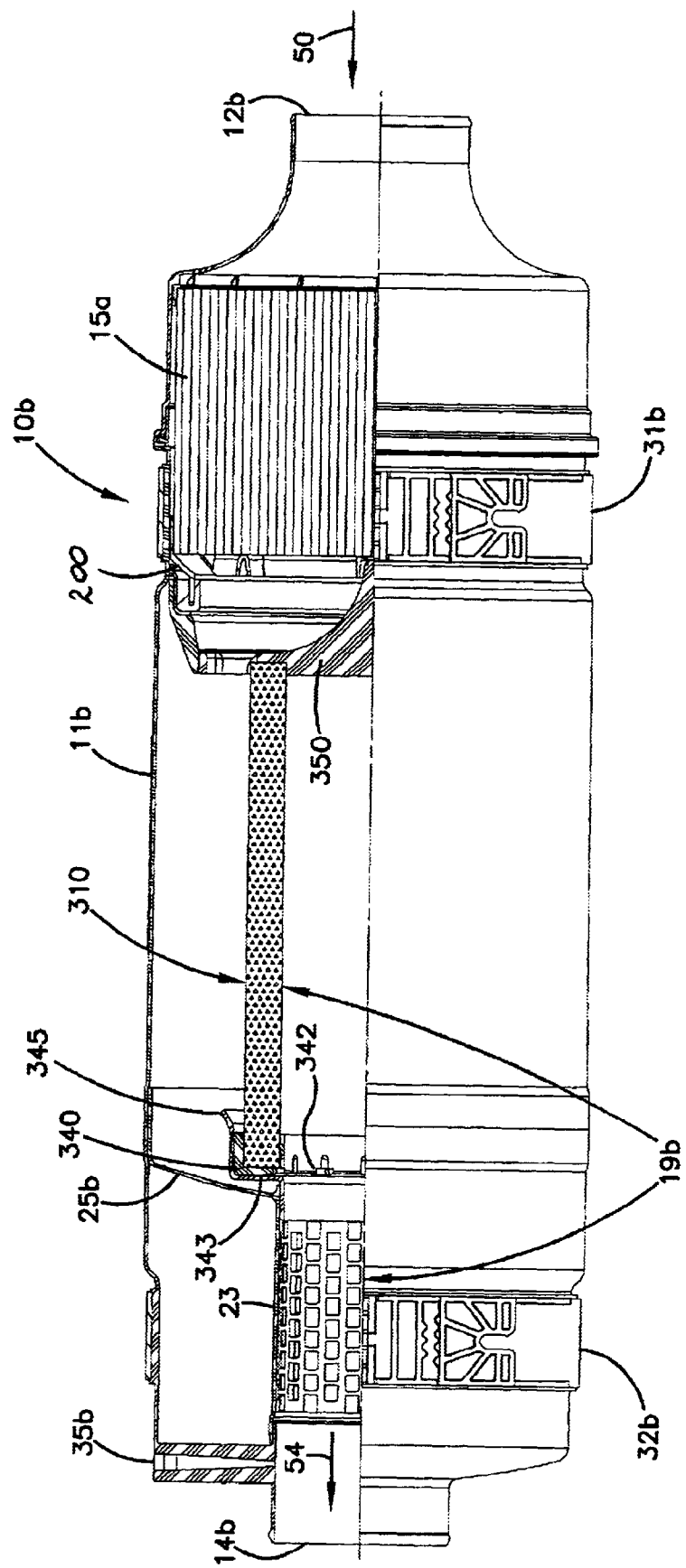
FIG. 12 is a fragmented cross-sectional front plan view of a second embodiment of a filter assembly having an external configuration of the filter assembly of FIG. 1.

A second example of a filter assembly is shown in fragmented cross-section in FIG. 12 as a filter assembly 10b. Similar to filter assembly 10a, filter assembly 10b is for use in a fuel cell operated passenger bus using a stack of PEM fuel cells providing an overall power output of 200 kW. It should be understood that filter assembly 10b is specifically designed for such an application, (i.e., a bus running on 200 kW), and that filter assemblies for other applications would be designed for those applications that are different in size, shape and configuration, without departing from the overall features of filter assembly 10b.

Filter assembly 10b includes a housing 11b which defines an inlet 12b and an outlet 14b. Dirty air 50 enters filter assembly 10b via inlet 12b, and clean air 54 exits via outlet 14b. The exterior of housing 11b includes mounting brackets 31b, 32b for positioning and securing filter assembly 10b in relation to surrounding equipment and structures. A sensor receptor port 35b is present on the exterior of housing 11b to allow for connection of a sensor, as may be desired. Filter element 15a is positioned within housing 11b. In filter assembly 10b of this embodiment, the filter element 15a used is the same as filter element 15a of filter assembly 10a of the first embodiment. Also within housing 11b is a noise suppression element generally illustrated at 19b.

Suppression element 19b comprises a resonator 23 configured to attenuate sound at a peak of about 900 Hz. Detailed information regarding resonators is provided above with respect to the first embodiment of filter assembly 10a. Resonator 23 has one end operatively connected in fluid communication with the outlet port 14b of the filter assembly, and an opposite end to which is secured an annular mounting bracket 342. Mounting bracket 342 has a perforated central portion allowing air to pass therethrough into resonator 23, and defines an annular seal seat 343 that includes a cylindrical extension flange 345 axially projecting away from resonator 23 in a direction toward inlet port 12b. The distal end of flange 345 is outwardly flared, for reasons which will be described below.

Figure 13:
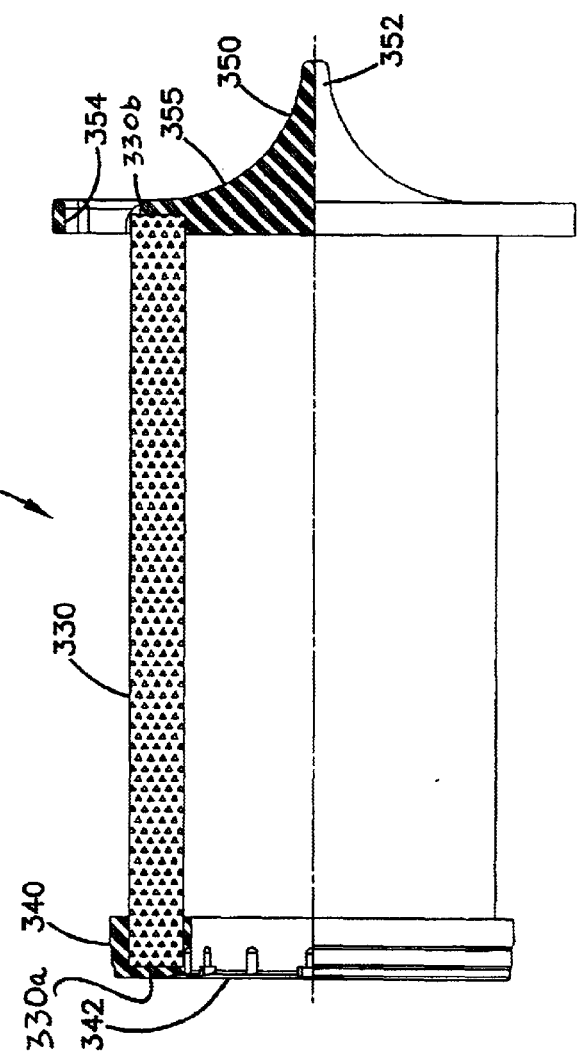
FIG. 13 is a fragmented cross-sectional view of the chemical absorption element portion of the filter assembly of FIG. 12.

Filter assembly 10b also includes an adsorbent element 310, shown enlarged in FIG. 13. Adsorbent element 310 comprises a cylindrical mass of carbon 330 extending between first and second ends 330a and 330b respectively. Carbon element 330 is in the preferred embodiment a hollow, cylindrical extrusion of activated carbon held together by a thermoplastic binder. Carbon element 330 can be produced, for example, by the teachings of U.S. Pat. No. 5,189,092 (Koslow), and U.S. Pat. No. 5,331,037 (Koslow).

In some embodiments, the filter element, such as filter element 15a, can be combined with an adsorbent element, such as adsorbent element 310, into a single construction that provides both particulate and chemical filtration. For example, a particulate removal media can be positioned around the external surface of carbon element 330. A filter element that includes both particulate and chemical removal portions is disclosed in U.S. Pat. No. 6,152,996 (Linnersten et al.).

The extruded cylindrical carbon configuration 330 of adsorbent element 310 provides a solid surface for direct attachment of a sealing system 340 thereto at end 330a and an end cap 350 at end 330b. Such "solid" carbon/binder extrusion also forms a unified adsorbent filter element 310 that does not itself release any carbon or other particles or contaminants into the filtered air stream.

Figure 14:
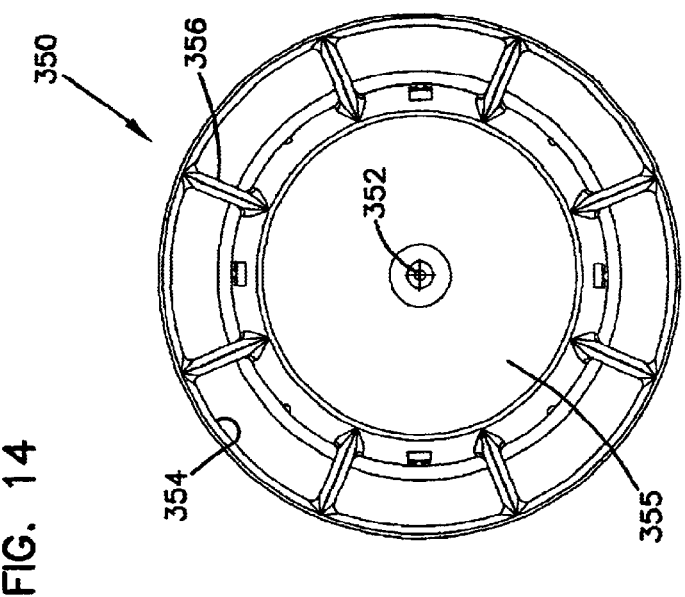
FIG. 14 is a right end view of an end cap of the chemical adsorption element of FIG. 13.

End cap 350 is sealingly secured to end 330*b* of carbon adsorbent element 330. End cap 350 diverts air exiting filter element 15*a* so that the air passes along the outer cylindrical surface of adsorbent 330 when mounted as shown in FIG. 12 rather than moving directly, axially into the central bore region of carbon adsorbent element 330. Air exiting from filter element 15*a* impinges on a curved surface 355 of cap 350 and is rerouted from its "straight-line" flow from filter 15*a* to a flow having a radial component. Surface 355 is an arcuately shaped surface radially extending from an axially aligned tip 352. Curved surface 355 smoothly diverts the air with minimal resistance. Tip 352 is the central point of exposed surface 355 of cap 350, although in some embodiments tip 352 may not be centrally positioned on cap 350. It will be appreciated that other surface configurations of end cap 350, such as flat or stepped surfaces, could be used. Referring to FIGS. 13 and 14, end cap 350 includes apertures 354 for passage of air therethrough and along the outer surface of carbon element 330. Radial arms 356 define and separate apertures 354 and provide structural support to cap 350. Additionally, some air may pass around the outer periphery of cap 350 and between cap 350 and the interior of housing 11*b*.

When adsorbent element 310 is operatively mounted as shown in FIG. 12, sealing system 340 provides an airtight seal at end 330*a* between adsorbent element 310 and seal seat 343 and flange 345 of mounting bracket 342 (FIG. 12). The flared distal end of flange 345 helps guide sealing system 340 to seal seat 343. The formed seal, in combination with baffle 25*b* and end cap 350, direct air flow through adsorbent element 310, and, under normal conditions, prevent unintended levels of air from passing through mounting bracket 342 and into resonator 23 before the air has first passed through carbon element 330. With air flowing in the direction of from inlet 12*b* to outlet 14*b*, baffle 25*b* forms a seal downstream from mounting bracket 342 and between the inner surface of the sidewalls of housing 11*b* and resonator 23. End cap 350, baffle 25*b* and sealing system 340 require all air flow from filter element 15*a* to pass through carbon adsorbent element 330 and through mounting bracket 342 before passing on to the filter assembly outlet 14*b*.

Sealing system 340 is typically made from a flexible, compressible material, such as polyurethane. The embodiment illustrated in FIG. 13 shows sealing system 340 having a "stepped" configuration of decreasing outermost dimension, which improves seating and sealing against sealing seat 343 and extension flange 345 of mounting bracket 342. Sealing system 340 directs air flow from filter element 15*a* through carbon element 330 before entering resonator 23.

In addition to managing air flow as described above, end cap 350 provides structural support and anchoring of second end 330*b* of absorbent element 310 to filter element 15*a* by engaging with frame 200, specifically, with center 215 of frame 200 (see FIG. 5). Tip 352 is adapted for cooperative insertion into and retention by the recessed portion of center 215. The fit of tip 352 within frame 200 should hold adsorbent element 310 in axial alignment with filter element 15*a*, although other features within the interior of housing 11*b* may be used to retain adsorbent element 310 in the desired position. Pressure in the axial direction exerted by frame 200 on tip 352 operatively hold adsorbent element 310 in sealing engagement with sealing system 340 against seal seat 343.

Each of sealing system 340 and cap 350 can be temporarily or permanently attached to carbon element 330. To provide a permanent attachment, sealing system 340 can be attached to carbon 330, for example, by adhesive, or by directly molding sealing system 340 onto carbon 330. For permanent attachment of cap 350, cap 350 can be, for example, adhesively attached to carbon 330. Cap 350 may include an annular recess to accept a portion of second end 330*b* of carbon 330.

Adsorbent element 310 functions both as a chemical removal portion and as an element of sound suppression element 19*b*. Adsorbent element 310 is functionally similar to adsorbent element 300 of FIGS. 9 and 10 in that it comprises adsorbent material for removing chemical contaminants from the air passing therethrough or thereby. The volume between the interior of housing 11*b* and adsorbent element 310 can function as a resonator to suppress or attenuate sound. Additionally, carbon material 330 of adsorbent element 310 directly adsorbs sound, thus providing independent sound attenuation. In a preferred embodiment, adsorbent element 310 is configured to attenuate a frequency peak of at least about 700 Hz, often greater than 700 Hz.

Other arrangements of adsorbent elements and adsorbent materials may also have both a chemical removal quality and a sound suppression quality. Additionally, physical or particular filter elements, such as filter element 15*a*, may have some sound suppression qualities.

A Third Embodiment of a Filter Assembly

Figure 21:
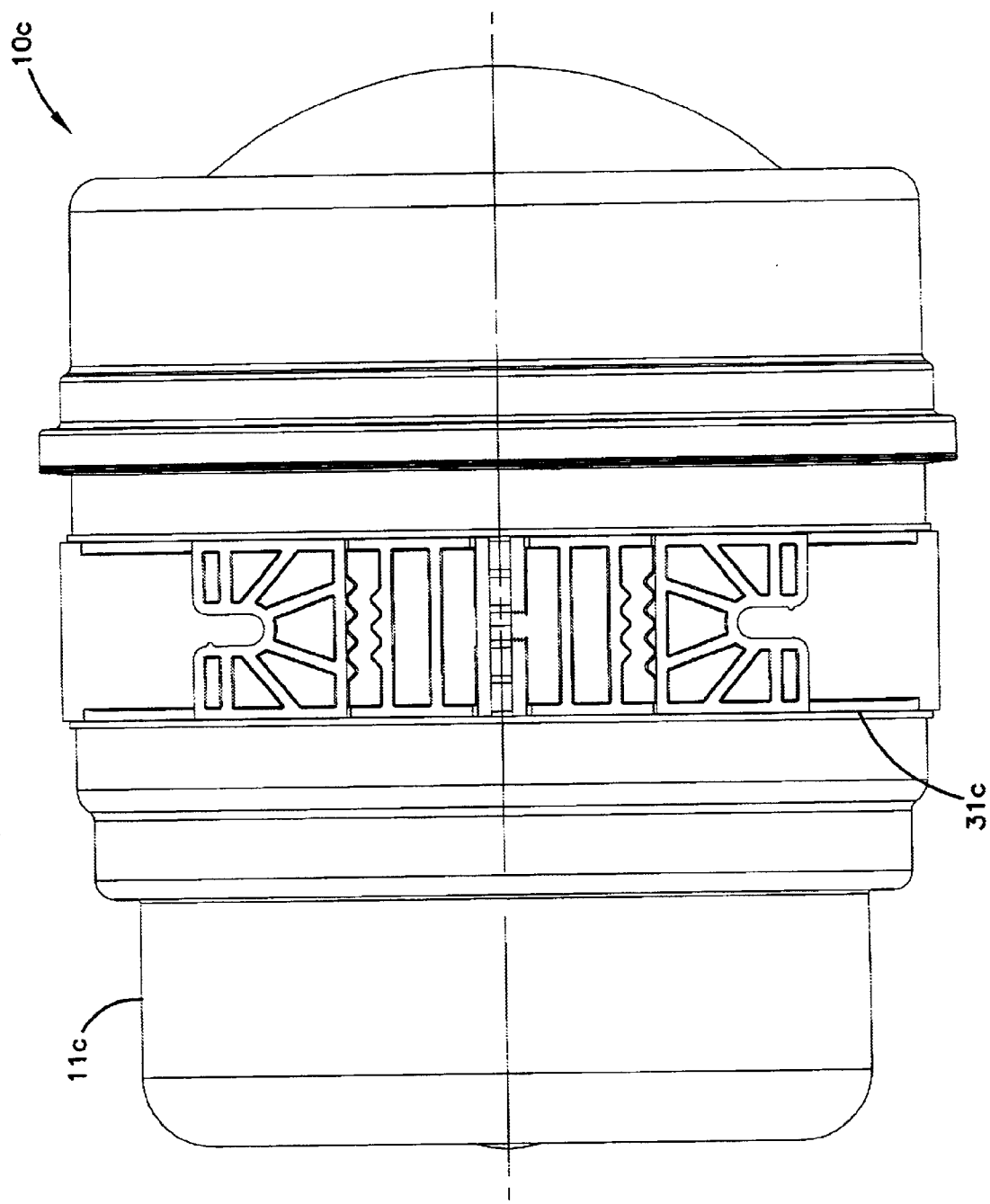
FIG. 21 is a front plan view of a third embodiment of a filter assembly, configured according to the principles of the present invention.
Figure 22:
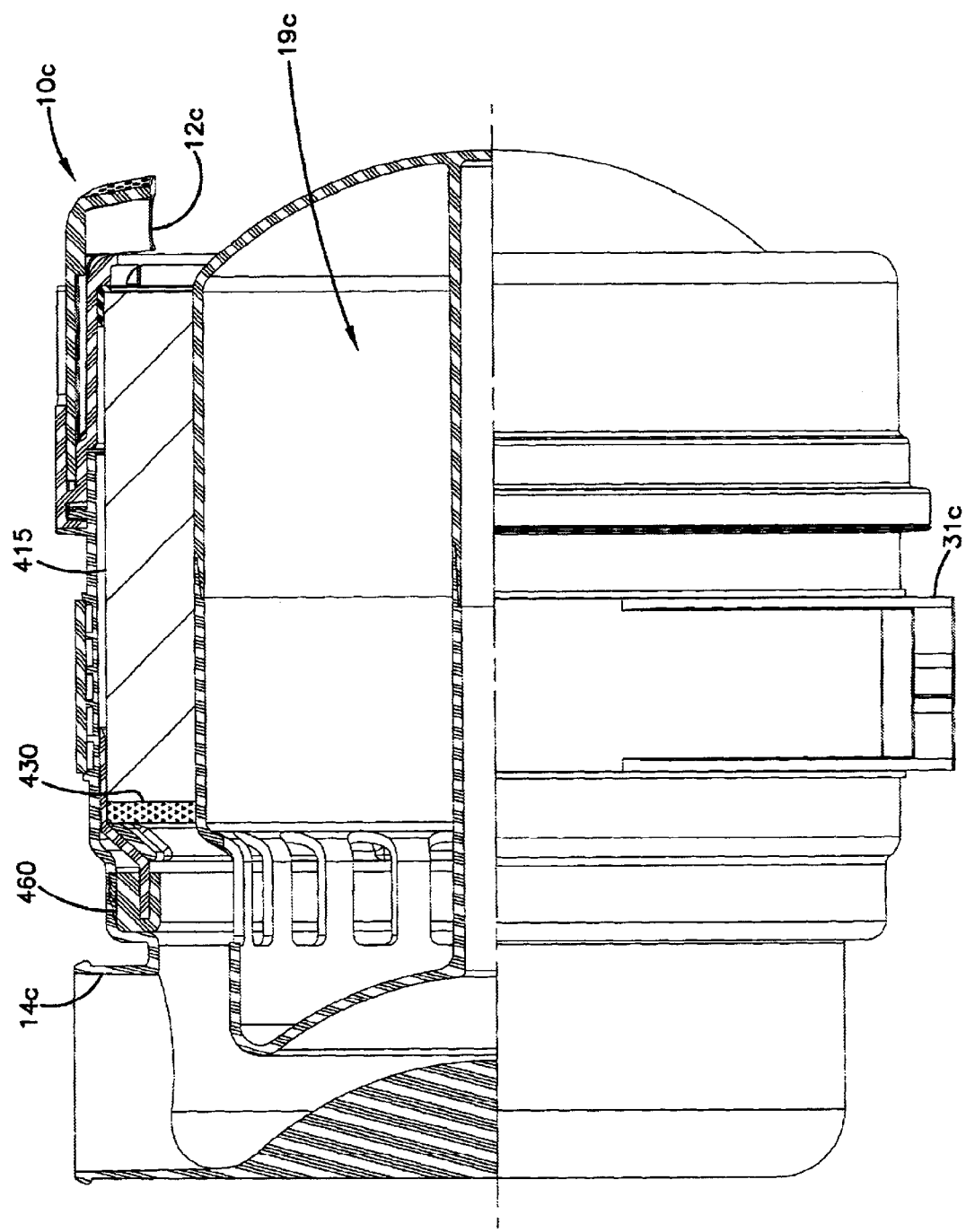
FIG. 22 is a fragmented cross-sectional front plan view of the filter assembly of FIG. 21.
Figure 23:
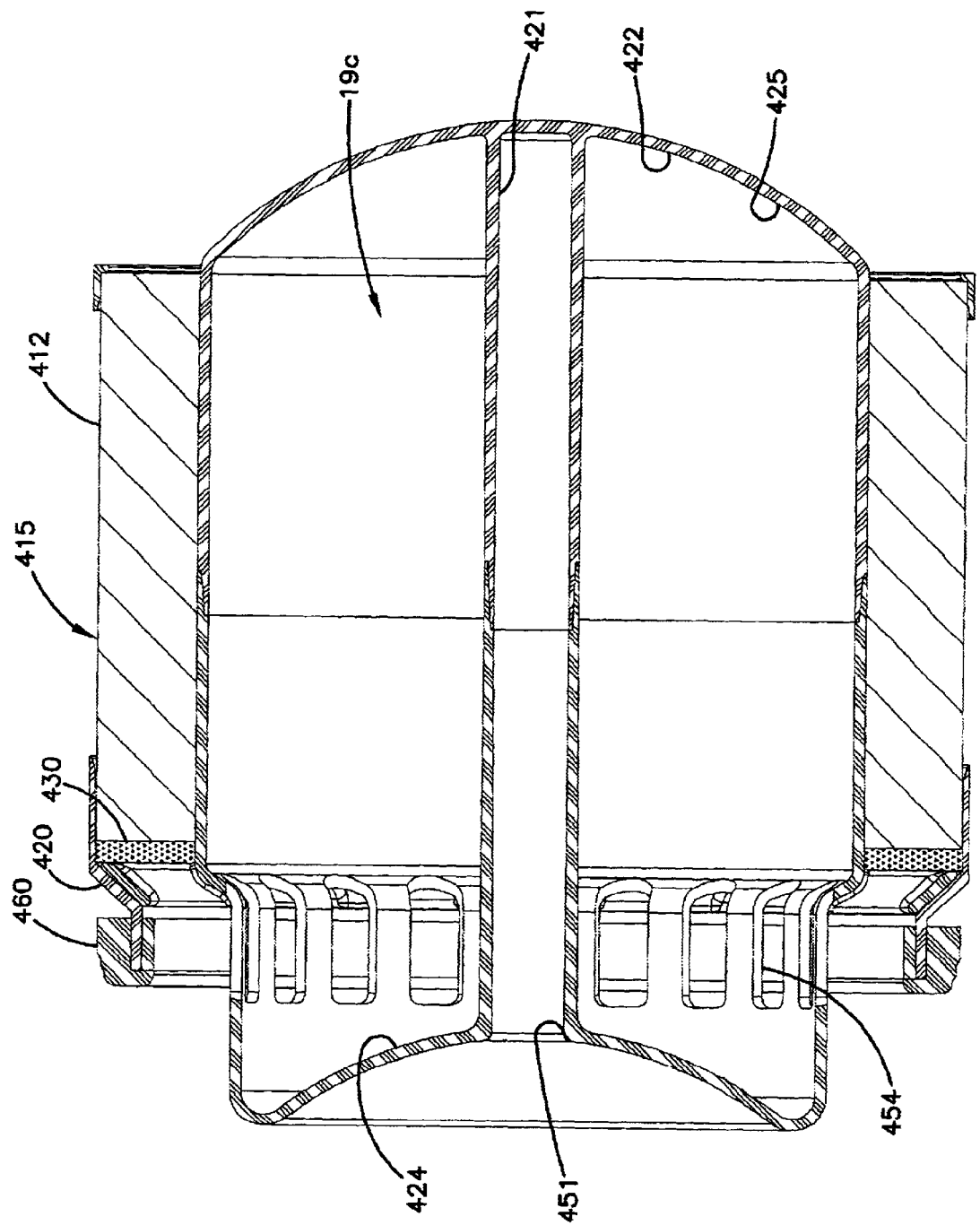
FIG. 23 is a cross-sectional view of the filter and noise suppression element, without the housing, of the filter assembly of FIGS. 21 and 22.

A third example of a filter assembly is shown in FIGS. 21–23 as a filter assembly 10*c*. Filter assembly 10*c* is adapted for use in a fuel cell operated vehicle, such as a passenger car, that uses a stack of PEM fuel cells providing an overall power output of 25 kW. It should be understood that filter assembly 10*c* is specifically designed for such an application, (i.e., a vehicle running on 25 kW), and that filter assemblies for other applications could be designed for those applications that are different in size, shape and configuration, without departing from the overall features of filter assembly 10*c*.

Filter assembly 10*c* includes a generally cylindrical housing 11*c* which defines an inlet 12*c* and an outlet 14*c*, shown in FIG. 22. Dirty air enters filter assembly 10*c* via inlet 12*c*, and clean air exits via outlet 14*c*. A physical or particulate filter element 415 is positioned within housing 11*c*. Filter element 415 is generally similar in construction to filter element 15*a* of filter assembly 10*a* of the first embodiment, in that filter element 415 has cylindrically or spirally wound fluted filtering media 412 that provides straight-through air flow. An end frame 420 that includes a sealing system 460 is connected to one end of filter element 415 for providing an air-tight, leak-free fit against housing 11*c*. Positioned downstream of filter element 415 is an adsorbent element 430. Adsorbent element 430 can be any adsorbent material described above, but is preferably a shaped adsorbent article made by, for example, a molding, a compression molding, or an extrusion process. Filter element 415 is similar to filter element 15*d* of FIG. 10 in that adsorbent element 430 is positioned between the particulate filtering media 412 and end frame 420. Also within housing 11*c* is a noise suppression element 19*c*. In this embodiment, noise suppression element 19*c* has a first resonator 421 and a second resonator 422, as described in more detail below.

Housing 11*c* can be made from any material that can provide the desired elements, e.g., inlet 12*c*, outlet 14*c*, etc. Examples of usable materials for housing 11*c* include metals or polymeric materials, such as epoxy, polycarbonate, polyethylene, and the like. Housing 11c has at least two separable sections, so that access can be gained to the contained filter element 415 and other elements. The multiple sections can be held together by latches, clamps, straps, or other suitable securing mechanisms. In a preferred embodiment, inlet 12c also functions as a latch for retaining the multiple sections together. The exterior of housing 11c includes a mounting bracket 31c, similar to brackets 31a, 31b described above, for positioning and securing filter assembly 10c in relation to surrounding equipment and structures.

Filter assembly 10c differs from previously described filter assemblies 10a, 10b in that the noise path through filter assembly 10c differs from the air flow path. In each of filter assemblies 10a, 10b, the noise follows a path that is the same but opposite in a direction from the air flow path. That is, the noise travels against the air passing through filter assemblies 10a, 10b. In this third embodiment, the noise enters filter assembly 10c through outlet 14c and then progresses into and is attenuated by noise suppression element 19c. Air flow enters filter assembly 10c via inlet 12c, passes through filter element 415, adsorbent element 430, and exits through outlet 14c. The normal air flow path does not pass through noise suppression element 19c, unlike in filter assemblies 10a, 10b where the air passes through noise suppression elements 19a, 19b, respectively.

Also, unlike filter assemblies 10a, 10b described above, filter assembly 10c uses an arrangement where filter element 415 is unitary with noise suppression element 19c. By the term "unitary", it is meant that filter element 415 is essentially permanently attached or otherwise connected to noise suppression element 19c, so that except for malicious or destructive acts, filter element 415 is not removable from noise suppression element 19c. In the embodiment shown, filter element 415 is constructed by winding layers of filtering media around noise suppression element 19c; noise suppression element 19c functions as a core for filter element 415. The specific details of making filter element 415 are those described above in relation to filter element 15a, except that the filtering media is wound around noise suppression element 19c. Preferably, adsorbent element 430 is also unitary with filter element 415 and noise suppression element 19c. It is understood that in alternate designs, any of filter element 415, adsorbent element 430 and noise suppression element 19c can be removable from one another.

Noise suppression element 19c includes first resonator 421 and second resonator 422, seen in FIG. 23. Noise enters filter assembly 10c via outlet 14c (FIG. 22) and is attenuated by first resonator 421 and second resonator 422. First resonator 421 has a generally small volume, defined by an elongate tube with a fairly small diameter. Second resonator 422 has a larger volume than first resonator 421 and is annularly and radially positioned surrounding first resonator 421. Second resonator 422 has a non-planar or non-flat first end 424 and an opposite non-planar or non-flat second end 425. Non-planar or non-flat ends 424, 425 minimize echoes and better attenuate noise. In the particular embodiment of second resonator 422, first end 424 is convex, in that it curves inward into resonator 422, and second end 425 is concave, in that it curves away and out from resonator 422. First end 424 includes a plurality of circumferentially spaced apertures 454 for passage of sound waves therethrough. That is, apertures 454 act as an inlet for sound waves into second resonator 422. For first resonator 421, a neck 451 acts as an inlet for sound waves into first resonator 421.

The frequencies attenuated by resonators 421, 422 depend on various dimensions, such as volume occupied, length, diameter, neck 451 diameter, number of apertures 454, curvature of ends 424, 425, and so on. In this embodiment, first resonator 421 is constructed for attenuating higher frequencies than second resonator 422. Additionally first resonator 421 attenuates a broader range of frequencies; that is, first resonator 421 has a broader attenuation range than that of second resonator 422.

Figure 25:
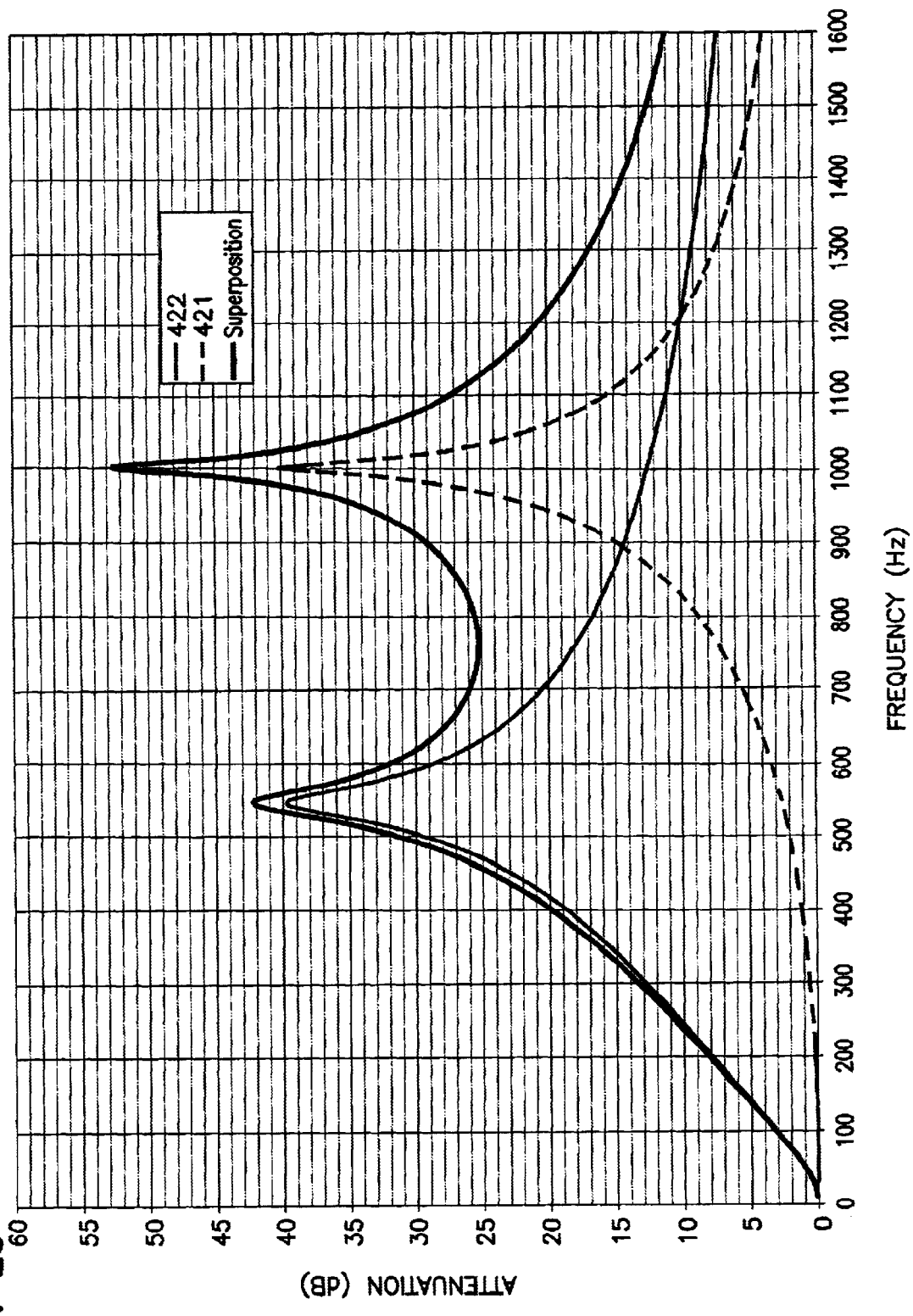
FIG. 25 is a graphical representation of sound attenuation versus frequency for the filter assembly of FIGS. 21 through 24.

FIG. 25 graphically illustrates the levels and frequencies attenuated by filter assembly 10c, where first resonator 421 attenuates sound about a peak frequency of about 1000 Hz, and second resonator 422 attenuates sound about a peak frequency of about 540 Hz. The composite sound attenuation of the two resonators 421, 422 spans the fundamental frequency ranges of a typical twin-screw compressor. First resonator 421 which is designed to resonate or attenuate a desired frequency, can also function as a receptor for mounting on a spindle when winding filtering media onto second resonator 422, to make filter element 415. The combined resonator structure 19c functions as a spool upon which the particulate filter media is wound.

Figure 24:
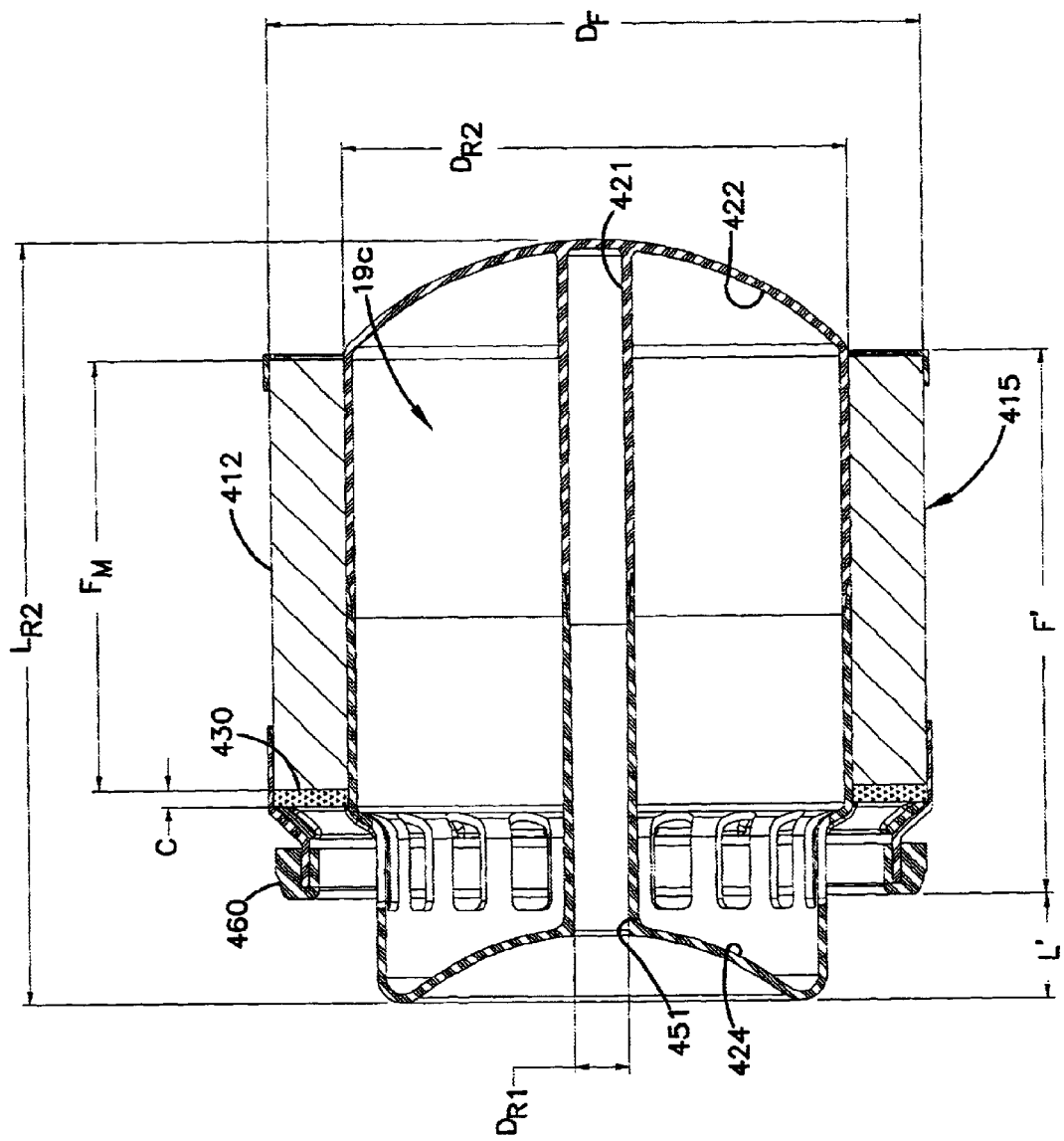
FIG. 24 is a cross-section view of the filter and noise suppression element similar to that of FIG. 23.

In the preferred embodiment shown, filter assembly 10c, specifically housing 11c, has a length no greater than about 500 mm, preferably no greater than about 400 mm. Additionally, filter assembly 10c, which is generally cylindrical, has a diameter no greater than about 300 mm, preferably no greater than about 260 mm. Specific characteristics of a preferred unitary filter element 415, adsorbent element 430, and noise suppression element 19c are illustrated in FIG. 24. As will be appreciated by those skilled in the art, the various dimensions of filter assembly 10c, and the elements such as filter element 415, adsorbent element 430, and noise suppression element 19c, are generally dependent on the volume allocated for occupation by filter assembly 10c within the system with which the filter assembly will be used.

In the preferred embodiment for which the filter assembly 10c was designed, filter element 415 has a length "F'" ("F prime") no greater than about 240 mm, preferably no greater than about 200 mm. In the preferred embodiment, "F'" is no greater than about 191 mm. Of this distance, no greater than about 50 mm, preferably no greater than about 20 mm is occupied by adsorbent element 430 as dimension "C". In the preferred embodiment, "C" is no greater than about 6.2 mm. Pleated filtering media 412, measured at "$F_M$", occupies no greater than about 200 mm, preferably no greater than about 180 mm. In the preferred embodiment, "$F_M$" is no greater than about 150 mm. The diameter occupied by filter element 415, "$D_F$", is generally no greater than about 290 mm, preferably no greater than about 270 mm. In the preferred embodiment, filter element 415 has a diameter "$D_F$" of about 230 mm.

For attaining the desired sound suppression characteristics of FIG. 25, noise suppression element 19a occupies the majority of the diameter of the combined filter element 415, adsorbent element 430, and noise suppression element 19c within housing 11c. In the embodiment shown in FIGS. 21 through 24, noise suppression element 19c comprises first resonator 421 and second resonator 422. First resonator 421 has a diameter "$D_{R1}$" at neck 451 of about 23 mm, and second resonator 422 has a diameter "$D_{R2}$" of about 178 mm. Second resonator 422 has an overall length "$L_{R2}$" of about 267 mm, with a portion of second resonator 422 extending past filter element 415; second resonator 422 extends distance "L'", about 37 mm, past sealing system 460 of filter element 415.

As will be appreciated by those skilled in the art, the specific volume occupied by first resonator 421 and second resonator 422 effects the sound attenuation characteristics of noise suppression element 19c. Specifically, the lengths and diameters $D_{R1}$ and $D_{R2}$ of resonators 421, 422 are a function of the desired sound attenuating properties of the resonator.

In typical specific embodiments of the combined filter element 415, adsorbent element 430, and noise suppression element 19c, when noise suppression element 19c occupies about 50 to 90 percent of the diameter of the combined filter element 415, adsorbent element 430, and noise suppression element 19c, the cross-sectional area of the filter unit 10c occupied by noise suppression element 19c is about 25 to 81 percent. Preferably, the diameter of noise suppression element 19c is about 60 to 80 percent of the total diameter, which represents only about 36 to 64 percent of the total cross-sectional area. In the preferred embodiment, when noise suppression element 19c has a diameter of about 178 mm and filter element 415 has a diameter of about 230 mm, noise suppression element 19c occupies 77 percent of the diameter but only 60 percent of the area.

Other combined arrangements of filter elements, adsorbent elements and noise suppression elements may be useful in filter assemblies according to the present invention. It will be understood that the noise suppression element can include any number of resonators. Also, as stated, the filter element, its housing, and/or adsorbent element (e.g., carbon element) may produce sound attenuation. These combined arrangements provide a single, removable and replaceable unit that removes particulate or physical contaminants, chemical contaminants, and also provides sound attenuation or suppression.

Before continuing on with a discussion of a fourth embodiment of a filter assembly, the remaining components of equipment 101 of FIG. 1, including fuel cell 102, are described.

Fuel Cells

In FIG. 1, equipment 101, with which filter assembly 10 of the present invention operates, includes fuel cell 102. Fuel cells are devices having two electrodes (an anode and a cathode) that sandwich an electrolyte. The primary types of known fuel cell configurations are discussed in the Background section of this specification. They all have the common characteristics briefly discussed below, but vary in operating temperatures and efficiency of operation. A hydrogen fuel source is directed to the anode, where the hydrogen electrons are freed, leaving positively charged ions. The freed electrons travel through an external circuit to the cathode and, in the process, provide an electrical current that can be used as a power source for external electrical circuits. The positively charged ions diffuse through the fuel cell electrolyte and to the cathode where the ions combine with the electrons and oxygen to form water, a by-product of the process. To speed the cathodic reaction, a catalyst is often used. Examples of catalysts often used in the fuel cell reaction include nickel, platinum, palladium, cobalt, cesium, neodymium, and other rare earth metals.

The proton exchange membrane (PEM) type of fuel cell is a popular fuel cell configuration for use in powering vehicles due to its low temperature operation, high power density and ability to quickly vary its power output to meet shifts in power demand. The PEM fuel cell is often simply referred to as a "low temperature fuel cell" because of its low operation temperature, typically about 70 to 100° C., sometimes as high as 200° C. Fuel cell 102 of the preferred embodiments illustrated herein is preferably of the PEM, low temperature configuration. High temperature fuel cells are typically not as sensitive to chemical contamination due to their higher operating temperature. High temperature fuel cells are, however, sensitive to particulate contamination, and some forms of chemical contamination, and thus high temperature fuel cells may benefit from the filtering features as described herein. Both types of fuel cells, low temperature and high temperature, are usually used in combination with noisy equipment.

Various fuel cells are commercially available from, for example, Ballard Power Systems, Inc. of Vancouver, Canada; International Fuel Cells, of Connecticut; Proton Energy Systems, Inc. of Rocky Hill, Conn.; American Fuel Cell Corp. of Massachusetts; Siemans AG of Erlangen, Germany; Smart Fuel Cell GmbH of Germany; General Motors of Detroit, Mich.; and Toyota Motor Corporation of Japan.

Individual fuel cells, each having an anode, cathode, and electrolyte, are configured into "stacks" to provide the desired amount of external power. It will be recognized that the principles of this invention will benefit the operation of generally any fuel cell configuration. For example, a typical passenger bus utilizes a fuel cell stack that generates about 200 kW of power. A smaller vehicle, such as a passenger car, can utilize a fuel cell stack that generates about 25 kW of power. A small stationary electronic device can utilize a fuel cell stack that generates 1 kW of power or less.

It will be recognized by one skilled in the art of fuel cells that the principles of the filter assemblies of this invention will benefit the operation of generally any fuel cell and any fuel cell configuration.

The threshold levels of contaminants that are acceptable by various fuel cells are dependent on the design of the fuel cell. For example, hydrocarbons (methane and heavier), ammonia, sulfur dioxide, carbon monoxide, silicones, and the like, are known to occupy space on the catalyst and inactivate the sites to reaction. Thus, these contaminants need to be removed prior to their entering the reactive area of the fuel cell.

The exact level of contamination, and types of contaminants that are acceptable will vary depending on the catalyst used, the operating conditions, and the catalytic process efficiency requirements. The filter assemblies of the present invention remove contaminants from the atmospheric air before the air is used in the fuel cell operation and apply to both low and high temperature operating fuel cell assemblies.

Compressors and Other Noise Making Equipment

As previously mentioned, equipment 101 also typically includes some air moving equipment or air handling mechanisms that emanate noise (sound waves), such as a compressor, fan, blower, or pump. This equipment provides the air (oxidizer) source to fuel cell 102. Unfortunately, moving parts such as rotors, impellers, lobes, vanes, pistons and other various parts of air moving equipment produce noise or sound waves. In many instances, the frequency of the sound waves produced spans 3 Hertz to 30,000 Hertz, sometimes as high as 50,000 Hertz, at levels of 85 to 135 db at one meter. While not all the noise emanating from the air moving equipment is objectionable, the various assemblies of the present disclosure are directed to reducing the most objectionable portions of the noise profiles associated with an particular noise generating portions of the system.

One common type of compressor 104 used in conjunction with fuel cell 102 is a "Lysholm" twin screw compressor available from Opcon Autorotor AB of Sweden. This type of compressor typically has a noise output in the range of about 160 to 1100 Hertz, and at a level as high as 135 db at one meter. Another common compressor is a "Roots blower" compressor. Other commonly used compressors include piston compressors, diaphragm compressors, centrifugal compressors, and axial compressors. Every compressor has a noise or frequency distribution associated with its operation. This distribution depends on the type of compressor and on variants such as the input and output flow rates. For many compressors, the frequency distribution includes more than one frequency peak.

Compressors are available from, for example, Paxton Products of Camarillo, Calif.; Pneumatec, Inc. of Kenosha, Wis.; Standard Pneumatic Products, Inc. of Newtown, Conn.; Vairex Corporation of Boulder, Colo.; and Honeywell Engines & Systems of Torrance, Calif. These compressors generally have a large air mass flow, typically about 10 grams/second to 400 grams/second.

Other air moving equipment that may be used with fuel cell 102 includes, for example, electric drive turbo chargers, compressor expanders, and the like.

In an attempt to optimize the operation of fuel cell 102, the air entering fuel cell 102 may be humidified, often close to its saturation point. The high level of moisture is desired to minimize any chance of the electrolytic membrane of fuel cell 102 of drying out and being incapable of carrying the charged ions. This humidification may occur upstream of compressor 104, downstream of filter assembly 10. Alternately, and possible preferably, this humidification may occur downstream of compressor 104. Drier air may be more suitable for passing through compressor 104.

Compressor Discharge Apparatus

Even though a filter element, such as filter element 15a, is present upstream of compressor 104 to remove contaminants such as particles and chemicals, from the incoming air stream, contaminant matter may be introduced to the air stream by the system itself, as for example, by compressor 104. Besides generating noise, the fast spinning rotors, impellers, lobes, vanes or pistons of compressor 104 may discard minute particulate, either from being dislodged from a crevice or crease or other hidden corner, or from surfaces of the moving parts. One type of contaminant is molybdenum particles, which are caused by the coating on the compressor internal parts weakening or being damaged during operation. The compressor unit 104 may also be a source of fluid contaminants such as oils or greases that may leak through the compressor or its seals and enter the air supply stream. Such contaminants, if allowed to enter the fuel cell stack, can prove to be very harmful or detrimental to effective or efficient operation of fuel cell 102.

A compressor discharge apparatus or exhaust apparatus 103 is illustrated in phantom in FIG. 1. In some processes, it may be desired or be beneficial to include a discharge apparatus such as apparatus 103 downstream of compressor 104 or other air moving equipment for removal of compressor generated or other contaminants from the air supply stream and/or for further suppression of noise from the system. Apparatus 103 can have, for example, a particulate filter, a chemical filter, a sound suppressor, or any combination thereof. The specific configuration and arrangement of apparatus 103 can significantly vary with different fuel cells assembly configurations and will depend, for example, on the desired efficiency of filter element 15 of filter assembly 10 for either or both particulate and chemical removal, and upon the requirements for the suppression of sound by filter assembly 10. As stated above, some compressors 104 may themselves contribute physical, chemical, or both types of contaminants to the air stream, downstream of filter assembly 10, which will need to be processed by an apparatus 103. Further, due to the location of discharge apparatus 103 in the system (i.e., downstream from compressor 104 and in closer proximity to fuel cell 102), the type and nature of filtration and component materials that can be effectively used by apparatus 103 may significantly differ from those used by filter element 15. Still further, apparatus 103 may include a humidifier that increases the moisture of the air passing therethrough. Additionally or alternatively, apparatus 103 may include a drain, floating check valve, or other device to remove excess water that has accumulated. Examples of suitable valve constructions are disclosed in U.S. Pat. No. 6,009,898 (Risch et al.) and U.S. Pat. No. 6,209,559 (Risch et al.).

Figure 16:
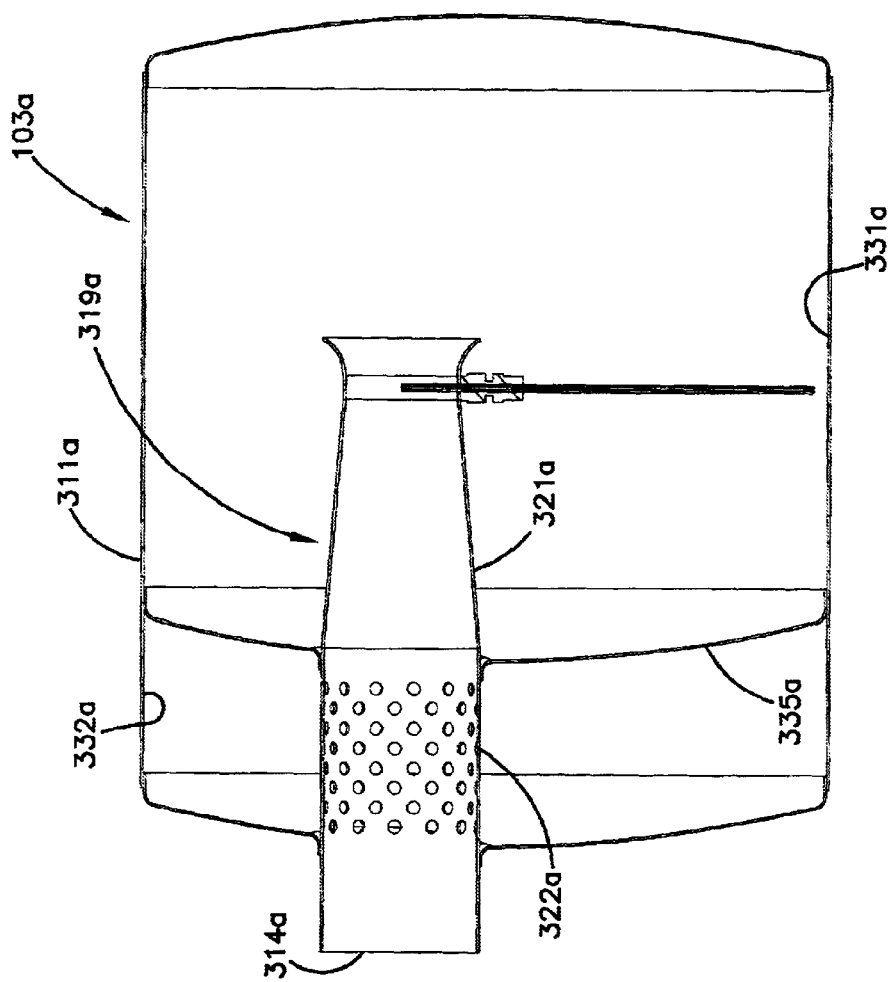
FIG. 16 is a cross-sectional view of the exhaust assembly of FIG. 15, taken along line 6—6 of FIG. 15.
Figure 15:
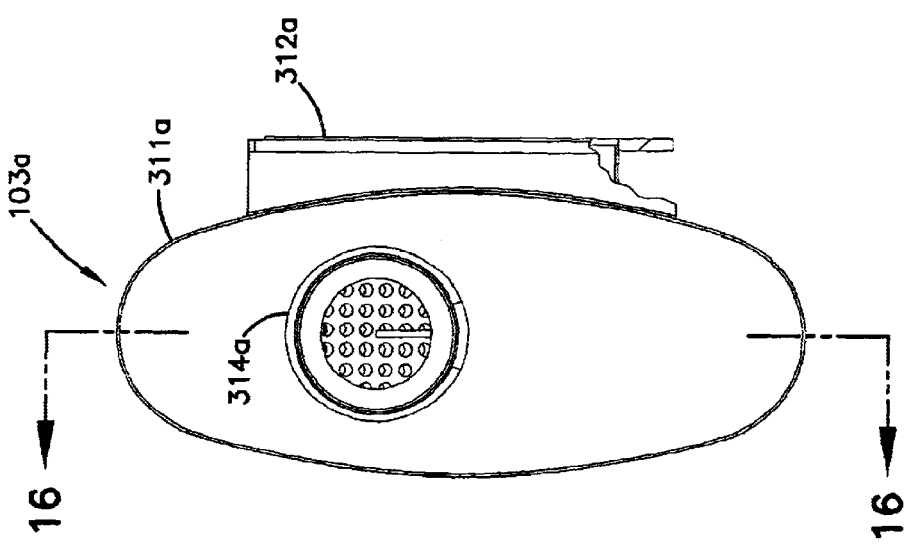
FIG. 15 is front plan view of one embodiment of an exhaust assembly of FIG. 1, configured according to the principles of the present invention.
Figure 17:
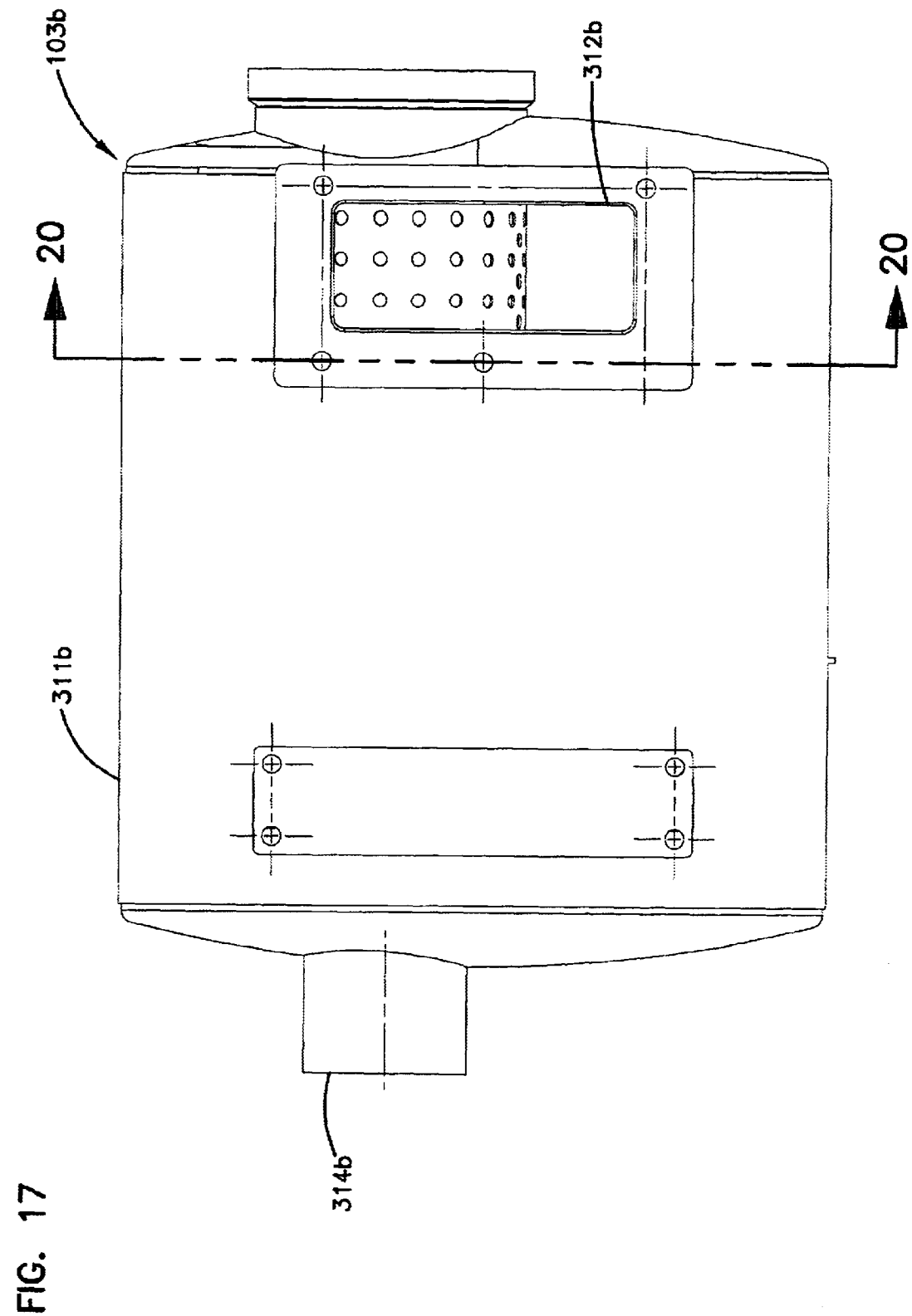
FIG. 17 is a side plan view of a second embodiment of an exhaust assembly of FIG. 1, configured according to the principles of the present invention.
Figure 18:
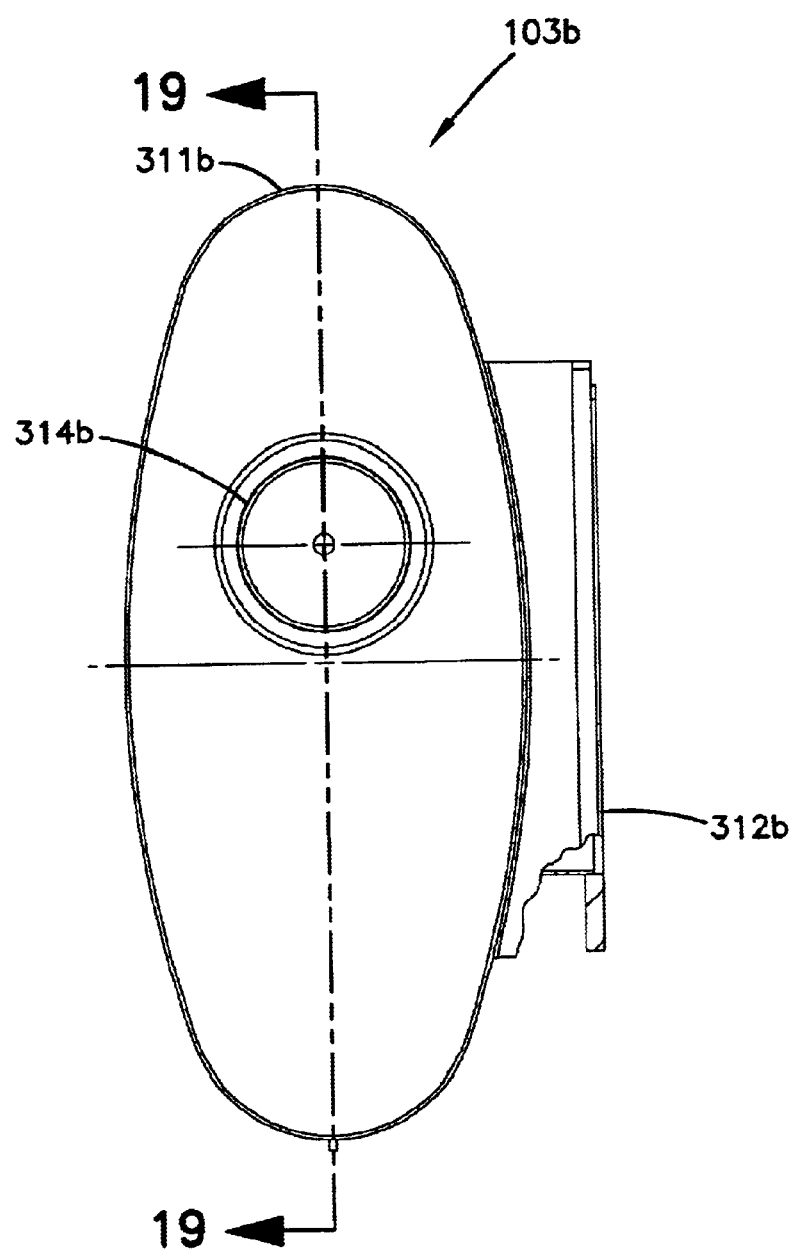
FIG. 18 is a front plan view of the exhaust assembly of FIG. 17.
Figure 19:
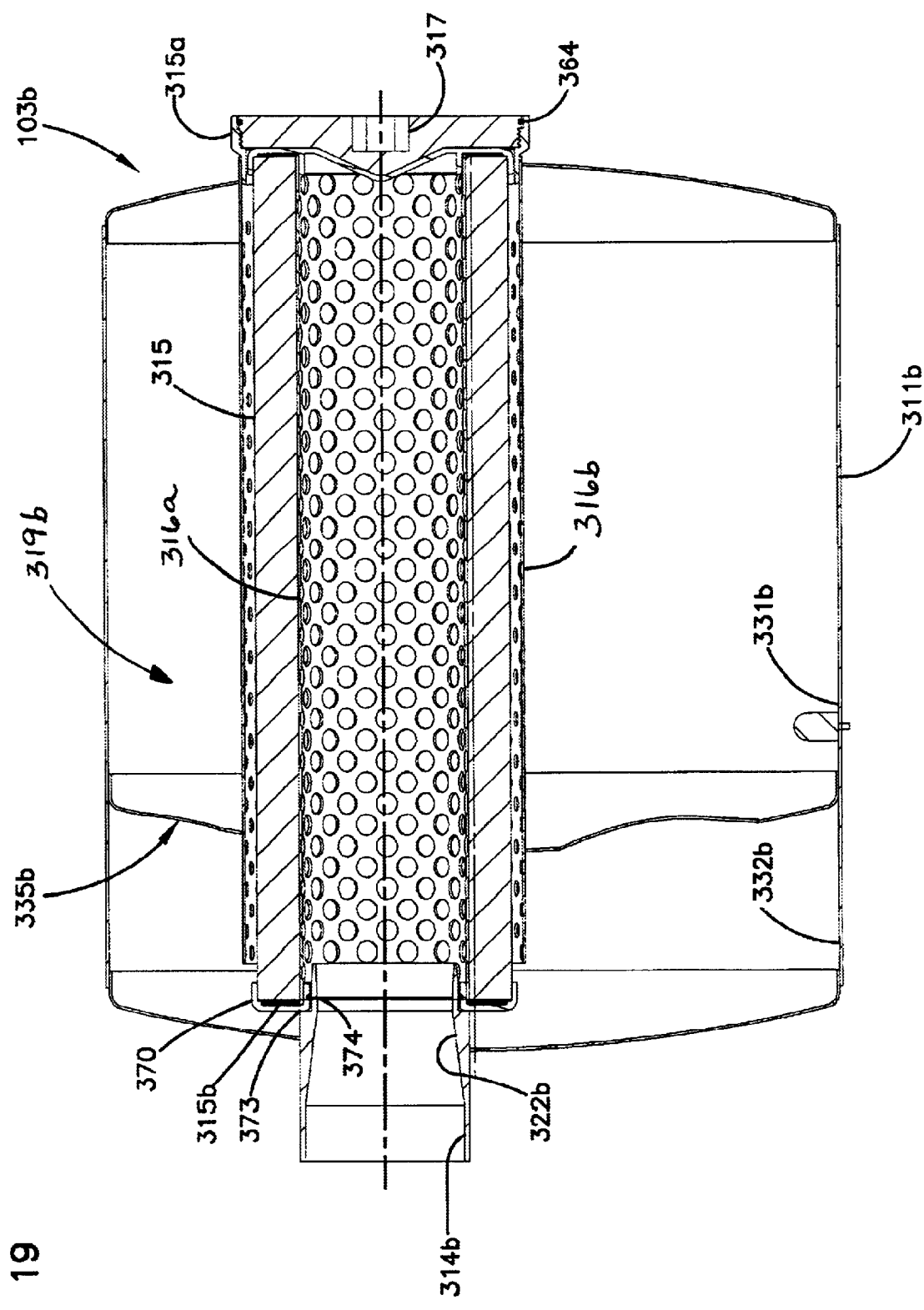
FIG. 19 is a cross-sectional view of the exhaust assembly of FIGS. 17 and 18 taken along line 19—19 of FIG. 18.
Figure 20:
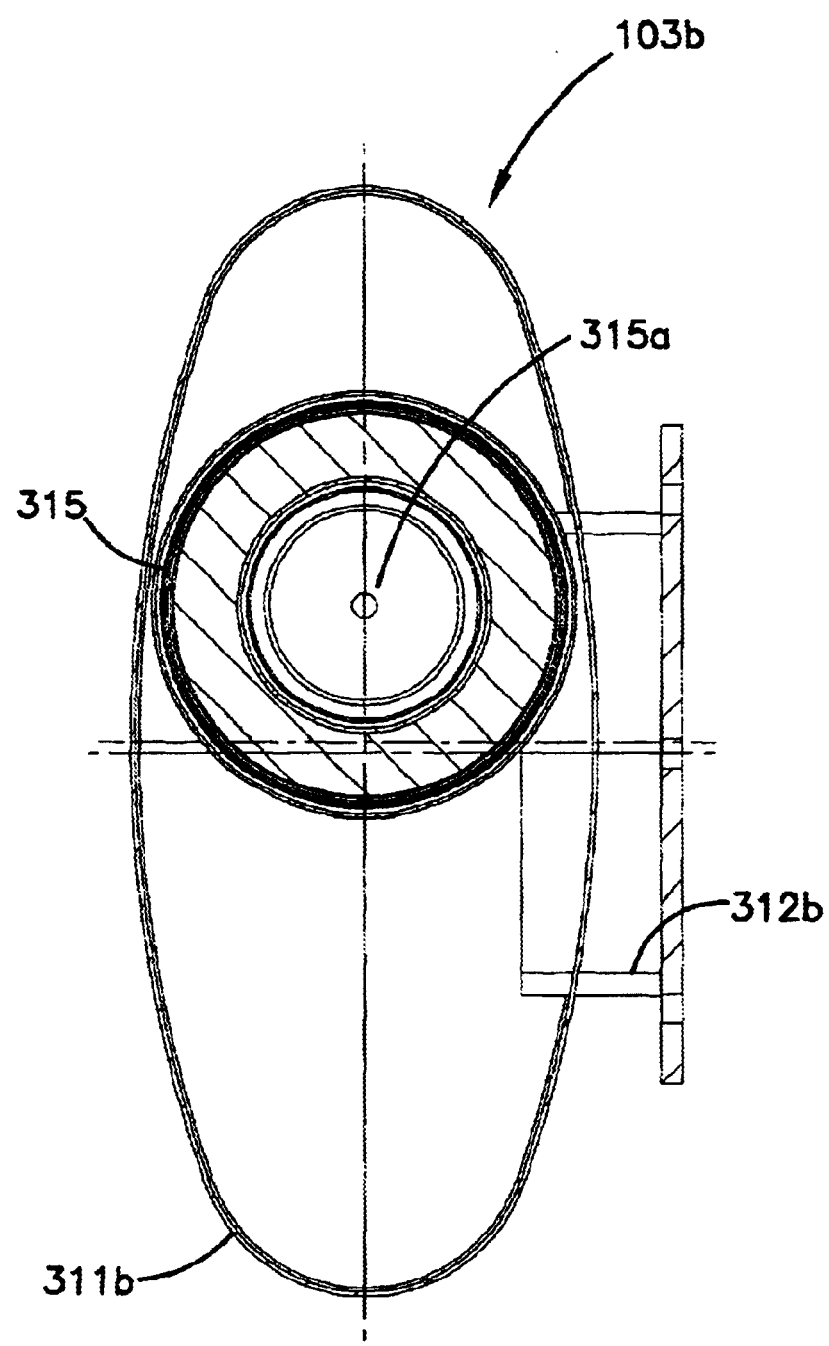
FIG. 20 is a cross sectional view of the exhaust assembly of FIGS. 17, 18 and 19 taken along line 20—20 of FIG. 17.

One embodiment of exhaust apparatus 103 is shown in FIGS. 15 and 16 as exhaust apparatus 103a. Exhaust apparatus 103a includes a housing 311a which defines an inlet 312a and an outlet 314a. Air from compressor 104 enters exhaust apparatus 103a via inlet 312a, and exits via outlet 314a to fuel cell 102. The air from compressor 104 will typically be at an elevated temperature and pressure, such as, 370° F. to 400° F. and about 3 atm. Because of these conditions, housing 311a is preferably a stainless steel alloy, such as 316 SS or 321 SS.

The embodiment of FIGS. 15 and 16 includes a sound suppression element 319a. Suppression element 319a comprises a sonic choke 321a and a resonator 322a ; each of sonic choke 321a and resonator 322a is positioned within a chamber 332a, 332a, respectively. Chambers 331a, 332a are defined by housing 311a and baffle 335a. Sonic choke 321a and resonator 322a can be designed to attenuate a desired peak frequency or a range of frequencies. The sound present downstream of compressor 104 is generally the same, or at least similar to, the sound encountering filter assembly 10 upstream of compressor 104 except that in the downstream case, both the air flow and the sound to be suppressed are flowing in the same direction. Detailed information regarding sound suppression elements and resonators is provided above.

Another embodiment of exhaust apparatus 103 is shown in FIGS. 17 through 20 as exhaust apparatus 103b. Exhaust apparatus 103b is similar to exhaust apparatus 103a, in that exhaust apparatus 103b includes a housing 311b defining an inlet 312b and an outlet 314b, with air entering via inlet 312b and exiting via outlet 314b. The embodiment of FIGS. 17 through 20 further includes a sound suppression element 319b that comprises a resonator 322b. Similar to exhaust apparatus 103a, exhaust apparatus 103b has two sound attenuation chambers 331b, 332b that are defined by housing 311b and separation baffle 335b.

Exhaust element 103b includes a filter element 315 for removing particulate matter, oil, and ambient salts from the air passing through exhaust element 103b. Filter element 315 is resistant to the high temperatures and pressure present within exhaust element 103b. One example of a filter element 315 includes an extension of pleated media mounted between two end caps 315a, 315b. Preferably, perforated inner and outer liners or sleeves 316a, 316b, respectively, are positioned adjacent the media to provide support and protection to the media; such sleeves or liners are well known. The sleeves, particularly the outer sleeve, may be attached to housing 311b, so that filter element 315 can be slid into and out from the outer sleeve when filter element 315 is removed from and replaced in exhaust assembly 130b.

The filter media of filter element 315 should be able to withstand the conditions downstream of compressor 104, that of elevated temperature and pressure, such as, 370° F. to 400° F. and about 3 atm, and often of high levels of humidity or moisture. Examples of usable media for filter element 315 include a polytetrafluoroethylene (PTFE) membrane carried by an aramid carrier (such as "Nomex" material), as is commercially available from Tetratec Corporation of Feasterville, Pa. It is desirable to use expanded PTFE membranes as they will not allow salts and petroleum products such as oils to penetrate therethrough. U.S. Pat. No. 6,123,751 (Nelson et al.), incorporated herein by reference, teaches the benefits of PTFE. Another usable media is fiberglass media.

Filter element 315 may assume a number of physical shapes such as oval or obround, similar to the shape of housing 311b, or filter element 315 may be circular. Planar filter panels may also be usable.

End cap 315a is a "closed end cap" in that it extends across and covers the end of the filter media such that no fluid flow access can be gained to the inside of filter element 315 through end cap 315a. End cap 315a is essentially a cover over that end of filter element 315 that can be removed as desired, for example, by removing an attachment mechanism such as hex nut 317. An o-ring 364 provides an air-tight seal between end cap 315a and the exterior of the filter media, which may be the perforated outer sleeve or liner. Filter element 315 is removable and replaceable from housing 311b.

End cap 315b is an "open end cap"; that is, open end cap 315b includes a opening therein, preferably, centrally located. End cap 315b, which is typically a permanent feature of filter element 315, seats on seat surface 370, specifically, on seal seat or ledge 373. An o-ring 374 provides an air-tight seal between ledge 373 and end cap 315b.

Combination Upstream Filter Assembly—Compressor—Exhaust Filter Assembly

Figure 26:
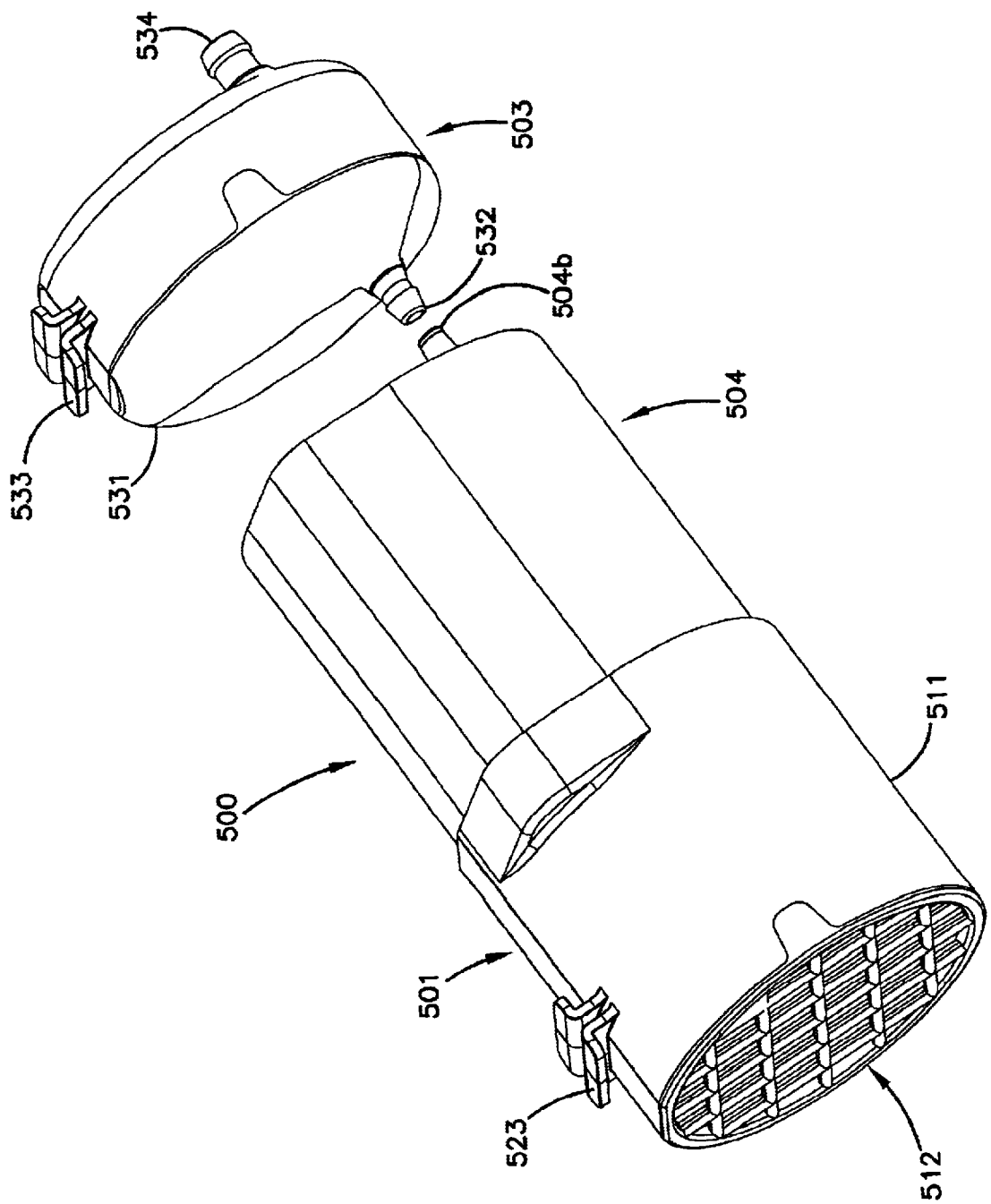
FIG. 26 is a perspective view of a small volume air handling system, comprising air handling equipment, an intake filter assembly and an exhaust filter assembly.
Figure 27:
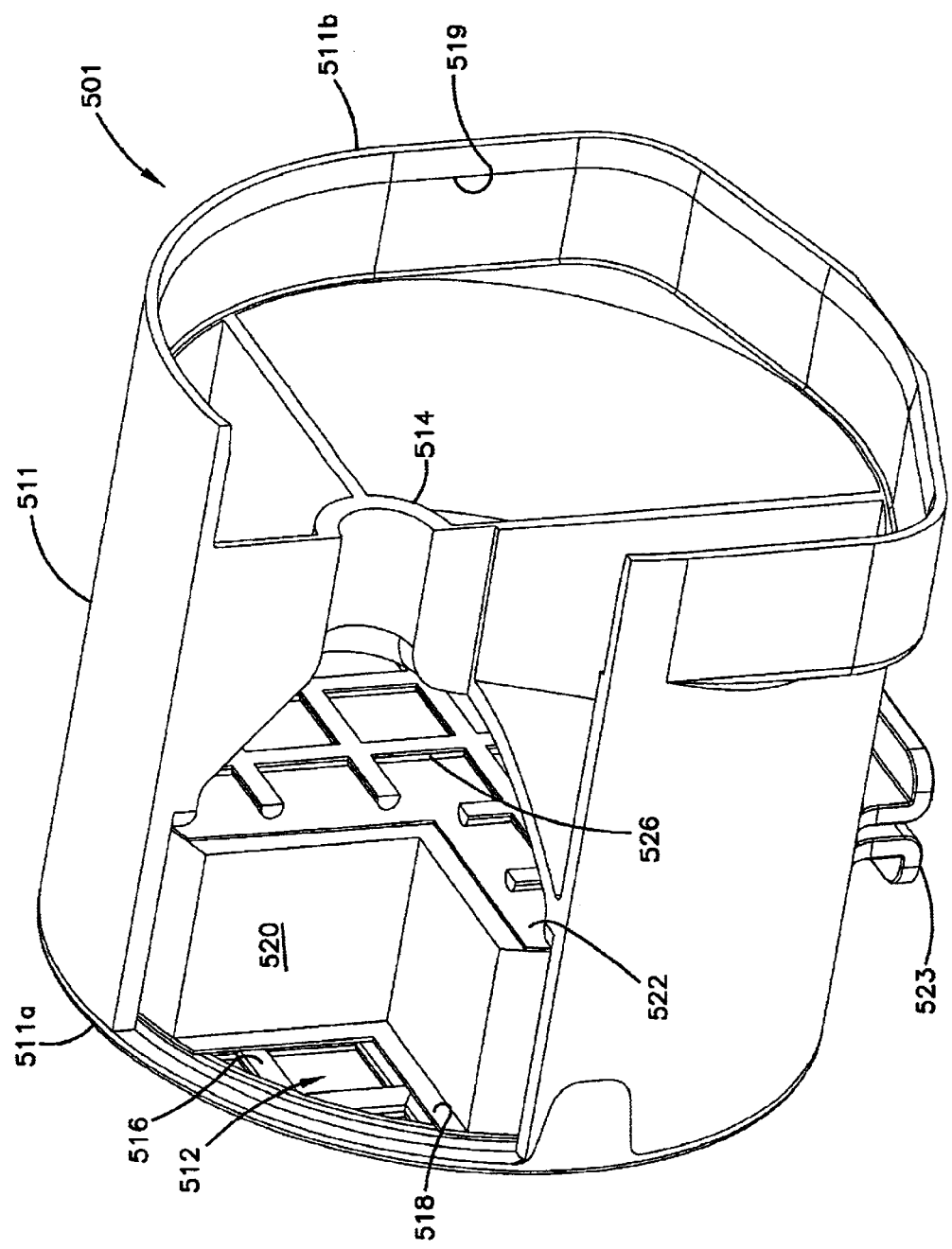
FIG. 27 is a fragmented cross-sectional perspective view of the intake filter assembly of FIG. 26.
Figure 28:
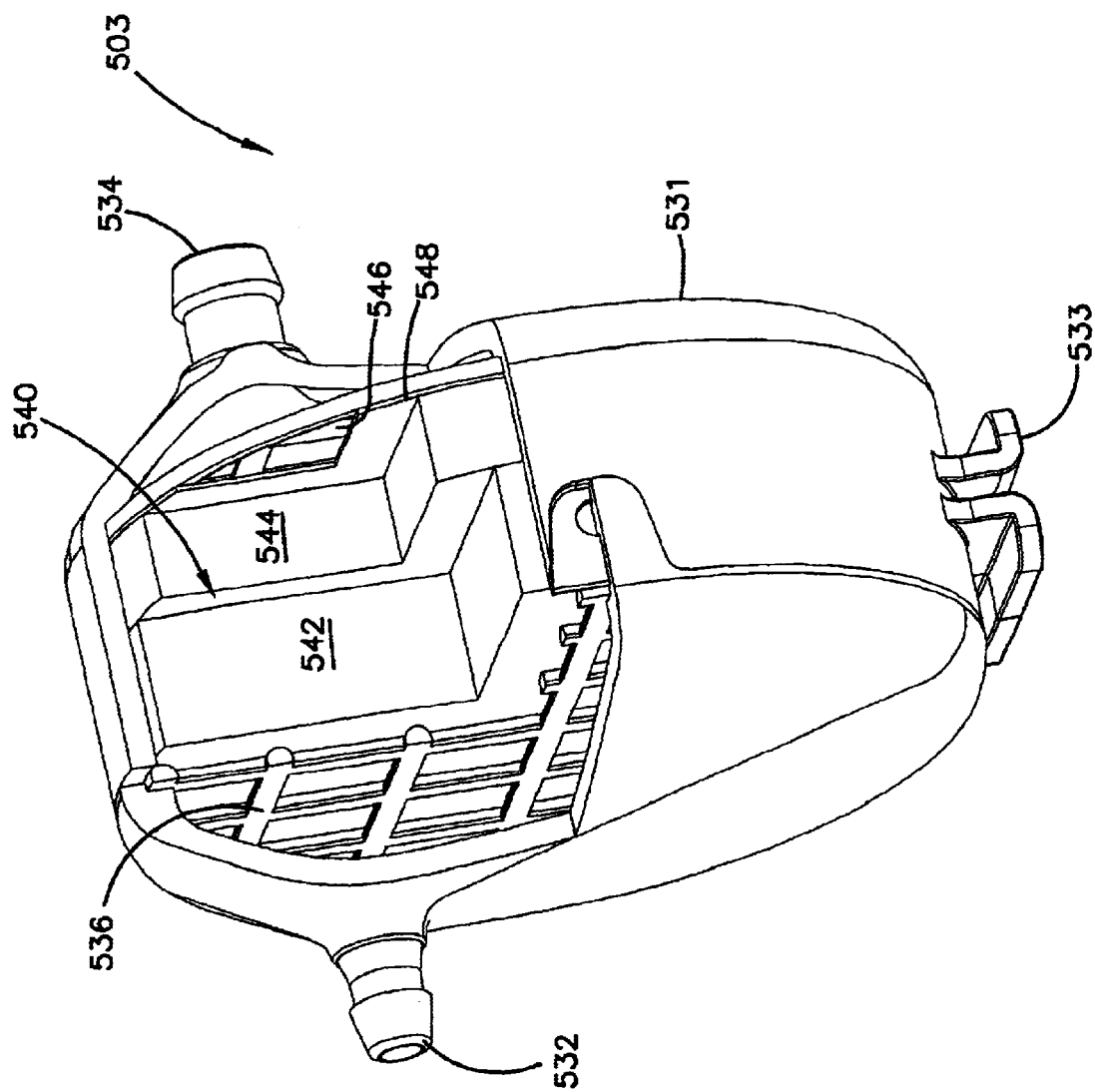
FIG. 28 is a fragmented cross-sectional perspective view of the exhaust filter assembly of FIG. 26.

An example of an embodiment of this invention that combines upstream filter and downstream exhaust filter assemblies in fluid communication with a compressor is illustrated in the air moving system 500 of FIGS. 26–28. Air moving system 500 is adapted for use with a fuel cell operated system, as might be used with a remote traffic camera or a vehicle radar detection system, that uses a stack of PEM fuel cells providing an overall power output of generally less than about 1 kW. Such lower power fuel cell applications require significantly less amount of oxidant (e.g., air) than the larger power applications previously described, and accordingly, these systems can utilize much smaller compressors or other air moving equipment; this in turn significantly reduces the overall size requirement of the filtration portion of the assembly.

Air moving system 500 has an upstream filter assembly 501 that provides clean filtered air to a compressor 504. An exhaust filter assembly 503 is located downstream of compressor 504 to remove any contaminants that may be introduced to the air stream by compressor 504 or that may not have been removed by filter assembly 501 before the air stream is introduced to a fuel cell. In this embodiment, compressor 504 is a small volume, vane compressor, providing an air flow rate of about 0.1 grams/second to about 0.15 grams/second. The diameter of compressor 504 is about 5 cm.

Referring to FIGS. 26 and 27, filter assembly 501 has a generally cylindrical housing 511 having a first end 511a and an opposite second end 511b, the housing defining an inlet 512 and an outlet 514. The diameter of housing 511 is similar to the diameter of compressor 504, about 5 cm. Dirty air enters filter assembly 501 via inlet 512, and clean air exits via outlet 514. Inlet 512 occupies an area essentially the same as the cross-sectional area of housing 511. Housing 511 includes a bracket 523, which can be used to mount filter assembly 501 as desired.

Extending across inlet 512 is a particulate screen 516, which removes large particles and contaminants and protects the below described filtration media. Screen 516 can remove leaves, debris, paper, and other large contaminants. Positioned downstream of screen 516 is a particulate filtration media 518. Media 518 can be any commonly used or suitable filtration media, such as paper or cellulose, fiberglass, polymeric scrim, and the like. Media 518 removes particulate contaminants, typically those about 0.01 micrometer and larger. Media 518 may include a surface layer or treatment, such as a polymeric nanofiber. One preferred surface layer for media 518 is a polymer blend of nylon copolymer and waterproofing additive, which is described in U.S. patent application Ser. No. 09/871,583 (which is incorporated herein by reference) and is commercially available from Donaldson Company Inc. under the trade designation EON filtration media. Filtration media 518 extends across the entire extent of inlet 512 and preferably forms a leak-free fit against housing 511, so that all air entering via inlet 512 must pass through media 518.

Positioned downstream of media 518 is an adsorbent filtration element 520. Adsorbent element 520 can be any adsorbent material described above, but in this embodiment, is a mass of carbon particles adhered together. Molded or extruded carbon materials, as described above, could alternately be used as adsorbent element 520. Adsorbent element 520 preferably extends across the entire cross-sectional area of housing 511 to form a leak-free fit, so that all air passing through housing 511 must pass through adsorbent element 520. Adsorbent element 520 may also provide some degree of sound attenuation.

Downstream of adsorbent element 520 is positioned a scrim 522 for retaining adsorbent element 520. Scrim 522 inhibits loose carbon particulates and other material from element 520 from escaping and passing through to compressor 504. Also downstream of adsorbent element 520 and downstream of scrim 522 is screen 526, which retainably supports scrim 522 and adsorbent element 520 and media 518 between it and screen 516.

Air, having entered via inlet 512 and passed through screen 516, filtration media 518, adsorbent element 520, scrim 522 and screen 526, exits via outlet 514. Outlet 514 is present in a volume 519, which is sized and shaped to accept a portion of compressor 504 therein, the portion having the compressor inlet (not illustrated). In the embodiment illustrated, housing 511 includes a shoulder or other feature that acts as a stop for compressor 504. Compressor 504 may occupy the entire volume 519, or a portion of volume 519 may remain empty. Any empty portion of volume 519 may provide some amount of sound suppression of sound waves emanating from compressor 504.

Housing 511 preferably forms a leak-free seal with compressor 504, so that air that has passed through filter assembly 501 and outlet 514 then passes directly into and through compressor 504, and air that has not passed through filter assembly 501 does not contaminate the interior of compressor 504. A rubber seal or any type of soft, compressible seal can be used. Alternately or additionally, a snap-fit seal may be used. From the inlet of compressor 504, air passes through compressor 504 and exits through outlet 504b. As mentioned above, the air flow rate through compressor 504 is about 0.1 grams/second to about 0.15 grams/second. Filter assembly 501, having a diameter of about 5 cm, is adequately sized for such a flow rate.

Outlet 504b is connected in direct fluid communication with the inlet of exhaust filter assembly 503, illustrated in more detail in FIG. 28. Exhaust filter assembly 503 removes contaminants, such as metal particles or lubricant mist, that may have been caused by compressor 504 or that may have passed through filter assembly 501 upstream of compressor 504 without being removed.

Exhaust filter assembly 503 has a generally cylindrical housing 531 defining inlet 532 and outlet 534. Inlet 532 and outlet 534, which are offset from the center of housing 531, each has a diameter significantly smaller than the diameter of housing 531. Air from compressor 504 enters exhaust filter assembly 503 via inlet 532, and cleaned air exits via outlet 534. Housing 531 includes a bracket 533, which can be used to mount exhaust filter assembly 503 as desired.

Downstream of inlet 532, and preferably extending the diameter of housing 531, is a screen 536, which retains particulate removal material 540 in its prescribed volume. Screen 536 generally does not remove any particulate from the air stream, as the apertures are generally adequately large to allow unobstructed flow there through. Particulate, and optionally liquid contaminants, are trapped by a removal material 540. Removal material 540 can be any suitable filtration media or other material suitable for removing the desired contaminants. Removal material 540 extends across the entire extent of housing 531 and preferably forms a leak-free fit against housing 531, so that all air entering via inlet 532 must pass through material 540.

In the embodiment shown in FIG. 28, removal material 540 comprises a first depth loading material 542 and a second depth loading material 544. An example of suitable depth loading materials is fiberglass in the form of a dense mat of fibers. Material 542 and material 544 may differ from one another by the density of the mat, the size of the fibers, any additives or coating on the fibers, or by other properties.

Positioned downstream of removal material 540 is particulate filtration media 548. Media 548 can be any commonly used or suitable filtration media, such as paper, fiberglass, polymeric scrim, and the like. Media 548 inhibits loose fibers or other material from removal material 540 from escaping and passing through to the fuel cell positioned downstream of assembly 500. One preferred media 548 comprises a polymer blend of nylon copolymer and waterproofing additive, which is described in U.S. patent application Ser. No. 09/871,583 and is commercially available from Donaldson Company Inc. under the trade designation EON filtration media. Also downstream of media 548 is screen 546, which provides support for media 548. Air, having passed through exhaust filter assembly 503 by passing through removal material 540 and media 548, exits via outlet 534 and progresses to the fuel cell downstream.

It is to be understood, however, that even though numerous characteristics and advantages of the present disclosure have been set forth in the foregoing description, together with details of the structure and function of the disclosure, such disclosure is illustrative only, and is not intended to be limiting to the scope of the invention in any manner, other than by the appended claims. The invention is not to be limited to the described embodiments, or to use with any particular type of fuel cell, or to the use of specific components, configurations or materials described herein. All alternative modifications and variations of the present invention which fall within the broad scope of the appended claims are covered.

We claim:

1. An air moving assembly for use with a fuel cell, the assembly comprising:
    (a) a first filter assembly comprising:
        (i) a first housing having an inlet and an outlet, the inlet configured to receive dirty air into the first filter assembly, and the outlet configured to deliver clean air from the first filter assembly;
        (ii) a first filter element within the housing, the filter element comprising a particulate filter portion constructed and arranged to remove particulate contaminants from the dirty air upstream from:
        (iii) a chemical filter portion comprising carbon adsorbent material arranged to remove chemical contaminants from the dirty air;
    (b) air moving equipment having an inlet and an outlet and operable to move air from its inlet to its outlet, the inlet of the air moving equipment being connected to receive air from the outlet of the first filter assembly; and
    (c) a second filter assembly comprising:
        (i) a second housing having an inlet and an outlet, the inlet connected to receive air into the second filter assembly from the outlet of the air moving equipment, and the outlet of the second filter assembly configured to deliver clean air from the second filter assembly to an oxidant inlet of a fuel cell; and
        (ii) a second filter element within the second housing, the second filter element comprising a particulate filter portion constructed and arranged to remove particulate contaminants from the air from the air moving equipment.

2. The air moving assembly according to claim 1, wherein the chemical filter portion comprises a second adsorbent material.

3. The air moving assembly according to claim 1, wherein the particulate filter portion of the first filter element comprises a cellulosic material.

4. The air moving assembly according to claim 1, wherein the particulate filter portion of the first filter element comprises a polymeric material.

5. The air moving assembly according to claim 1, wherein the first housing provides sound suppression.

6. The air moving assembly according to claim 1, wherein the particulate filter portion of the second filter element comprises depth media.

7. The air moving assembly according to claim 6, wherein the depth media comprises fiberglass.

8. The air moving assembly according to claim 1, wherein the air moving equipment is a compressor.

9. The air moving assembly according to claim 8, wherein the compressor provides an outlet flow rate of about 0.1 to 0.15 grams air/second.

10. An air filtration assembly for use with a fuel cell and air moving equipment, the assembly comprising:
    (a) a first filter assembly comprising:
        (i) a first housing having an inlet and an outlet, the inlet configured to receive dirty air into the first filter assembly, and the outlet configured to deliver clean air from the first filter assembly to an inlet of air moving equipment;

(ii) a first filter element within the housing, the filter element comprising a particulate filter portion constructed and arranged to remove particulate contaminants from the dirty air upstream from:

(iii) a chemical filter portion comprising carbon adsorbent material arranged to remove chemical contaminants from the dirty air; and (b) a second filter assembly comprising:

(i) a second housing having an inlet and an outlet, the inlet connected to receive air into the second filter assembly from an outlet of air moving equipment, and the outlet of the second filter assembly configured to deliver clean air from the second filter assembly to an oxidant inlet of a fuel cell; and (ii) a second filter element within the second housing, the second filter element comprising a particulate filter portion constructed and arranged to remove particulate contaminants.

11. The air filtration assembly according to claim 10, wherein the chemical filter portion comprises a second adsorbent material.

12. The air filtration assembly according to claim 10, wherein the particulate filter portion of the first filter element comprises a cellulose material.

13. The air filtration assembly according to claim 10, wherein the particulate filter portion of the first filter element comprises a polymeric material.

14. The air filtration assembly according to claim 10, wherein the particulate filter portion of the second filter element comprises depth media.

15. The air filtration assembly according to claim 14, wherein the depth media comprises fiberglass.

16. The air filtration assembly according to claim 15, wherein the depth media comprises a first fiberglass media and a second fiberglass media.

17. A power producing assembly comprising:

(a) a first filter assembly comprising:

(i) a first housing having an inlet and an outlet, the inlet configured to receive dirty air into the first filter assembly, and the outlet configured to deliver clean air from the first filter assembly;

(ii) a first filter element within the housing, the filter element comprising a particulate filter portion constructed and arranged to remove particulate contaminants from the dirty air; and (iii) a chemical filter portion comprising carbon adsorbent material arranged to remove chemical contaminants from the dirty air, the chemical filter portion downstream from the particulate filter portion;

(b) an air compressor having an inlet and an outlet and operable to move air from its inlet to its outlet, the inlet of the compressor being connected to receive air from the outlet of the first filter assembly;

(c) a second filter assembly comprising:

(i) a second housing having an inlet and an outlet, the inlet connected to receive air into the second filter assembly from the outlet of the compressor; and (ii) a second filter element within the second housing, the second filter element comprising a particulate filter portion constructed and arranged to remove particulate contaminants from the air from the compressor; and (d) a fuel cell having an oxidant inlet, the outlet of the second filter assembly configured to deliver clean air from the second filter assembly to the oxidant inlet.

* * * * *

UNITED STATES PATENT AND TRADEMARK OFFICE
CERTIFICATE OF CORRECTION

PATENT NO. : 6,797,027 B2
DATED : September 28, 2004
INVENTOR(S) : Stenersen et al.

It is certified that error appears in the above-identified patent and that said Letters Patent is hereby corrected as shown below:

Column 6,
Line 18, "1101" should read -- 101 --

Column 11,
Line 32, "15 a" should read -- 15$a$ --

Column 14,
Line 37, "111$a$" should read -- 11$a$ --

Signed and Sealed this

Fifth Day of April, 2005

JON W. DUDAS
*Director of the United States Patent and Trademark Office*